US007213206B2

(12) United States Patent
Fogg

(10) Patent No.: US 7,213,206 B2
(45) Date of Patent: May 1, 2007

(54) RELATIONSHIP USER INTERFACE

(76) Inventor: Brian J. Fogg, P.O. Box 20456, Stanford, CA (US) 94309

( * ) Notice: Subject to any disclaimer, the term of this patent is extended or adjusted under 35 U.S.C. 154(b) by 0 days.

(21) Appl. No.: 10/659,580

(22) Filed: Sep. 9, 2003

(65) Prior Publication Data

US 2005/0055639 A1    Mar. 10, 2005

(51) Int. Cl.
*G06F 3/00* (2006.01)
(52) U.S. Cl. ............... 715/706; 715/769; 715/748; 715/753; 715/758
(58) Field of Classification Search ............... 715/835, 715/706, 748, 753, 757–758, 769, 752
See application file for complete search history.

(56) References Cited

U.S. PATENT DOCUMENTS

| | | | |
|---|---|---|---|
| 5,467,441 A | 11/1995 | Stone et al. | |
| 5,479,603 A | 12/1995 | Stone et al. | |
| 5,490,244 A * | 2/1996 | Isensee et al. ............... | 715/748 |
| 5,491,743 A * | 2/1996 | Shiio et al. .................. | 709/204 |
| 5,596,690 A | 1/1997 | Stone et al. | |
| 5,596,703 A * | 1/1997 | Eick et al. ................... | 715/700 |
| 5,617,114 A | 4/1997 | Bier et al. | |
| 5,652,851 A | 7/1997 | Stone et al. | |
| 5,729,704 A | 3/1998 | Stone et al. | |
| 5,818,455 A | 10/1998 | Stone et al. | |
| 5,841,437 A | 11/1998 | Fishkin et al. | |
| 5,889,843 A * | 3/1999 | Singer et al. ........... | 379/202.01 |
| 5,920,856 A | 7/1999 | Syeda-Mahmood | |
| 5,983,218 A | 11/1999 | Syeda-Mahmood | |
| 6,219,045 B1 * | 4/2001 | Leahy et al. ................. | 715/757 |
| 6,323,857 B1 * | 11/2001 | Mielekamp et al. ........ | 345/419 |
| 6,326,946 B1 | 12/2001 | Moran et al. | |
| 6,340,957 B1 | 1/2002 | Adler et al. | |
| 6,343,313 B1 * | 1/2002 | Salesky et al. ............. | 709/204 |
| 6,373,936 B1 * | 4/2002 | Raniere et al. ........ | 379/202.01 |
| 6,477,387 B1 * | 11/2002 | Jackson et al. ............. | 455/519 |
| 6,559,863 B1 * | 5/2003 | Megiddo ..................... | 715/753 |
| 6,573,916 B1 | 6/2003 | Grossweiler, III et al. | |
| 6,584,479 B2 | 6/2003 | Chang et al. | |
| 6,690,654 B2 * | 2/2004 | Elliott et al. ................ | 370/260 |
| 6,784,901 B1 * | 8/2004 | Harvey et al. .............. | 715/757 |
| 7,117,273 B1 * | 10/2006 | O'Toole et al. ............. | 709/252 |
| 2003/0028595 A1 * | 2/2003 | Vogt et al. .................. | 709/204 |
| 2005/0267887 A1 * | 12/2005 | Robins .......................... | 707/9 |

OTHER PUBLICATIONS

Nardi, Bonnie A., "Integrating Communication and Information Through Contact Map", Communication of the ACM, Apr. 2002/vol. 45, No. 4, pp. 89-94.

(Continued)

*Primary Examiner*—Weilun Lo
*Assistant Examiner*—Sara Hanne
(74) *Attorney, Agent, or Firm*—Blakely, Sokoloff, Taylor & Zafman; Stephen M. De Klerk

(57) ABSTRACT

A user interface having a user icon and associate icons to visualize an interpersonal relationship and to communicate in order to nurture the relationship. In one embodiment of the invention, the user icon represents a user and the associate icons represent numerous associates. The associate icons are positioned radially about the user icon on the user interface to visualize a relationship between the user and each associate.

33 Claims, 22 Drawing Sheets

OTHER PUBLICATIONS

"Rethinking the GUI for the Big Picture", CIO Insight.com, Oct. 2002, 4 pages.
"The Hype Over Hyperbolic Browsers", CIO Insight.com, May 2002, 5 pages.
"Tektronix Exec Sees Interactive Visualization as Important Trend; Leaders' Crystal Ball Computer Graphics in the 1990s", Feb. 1990, 3 pages.
"My Virtual Model Inc. and QuickDog Inc. Join Forces to Provide Unique Personalized Shopping Experience", PR Newswire, Jan. 2001, 2 pages.
"Pioneering Products Finalists Announced; Data Visualization and Customer Analytics Products fAce Off in the 2001 Pioneering Products Shootout", PR Newswire, Feb. 2001, 3 pages.
"Visualization: from promise to progress: leading-edge software reaches for the elusive goal of truly interactive and extensible visualization", Jul. 1992, 3 pages.
"Visualizing Online Activity", Association for Computing Machinery. Communications fo the ACM, Aug. 2001, 6 pages.
"Building the Human Network", Affinity Engines, Inc., 2003, www.affinityengines.com, 3 pages.
"inCircle: 360° of Stanford Alumni Connections", http://incircle.stanfordalumni.org, 4 pages.
"Trends in Data Visualization Software for Business User", DM Review, May 2000, 4 pages.
"Magic Lens Demo in Java," Copyright 1996 Xerox Corporation, www2.parc.com/istl/project/MagicLenses/SimpleDemo.html., 2 pages.
Shneiderman, Ben, "Dynamic queries, starfield displays, and the path to Spotfire," Feb. 4, 1999, www.cs.umd.edu/hcil/spotfire/, 4 pages.
"The Dynamic HomeFinder," http://dq.com/homefind/index.html, 2 pages.
"Dynamic Homefinder," http://dq.com/homefind/dhintro.htm, 8 pages.
Williamson, Christopher, "How a Task-Centered Design Can Save Your Project: A Case Study with the Dynamic HomeFinder," http://dq.com/homefind/dhsigchi.htm, 4 pages.
Williamson, et al., "Dynamic Homefinder Table of Contents," http://dq.com/homefind/dhtoc.htm, 4 pages.
"Dynamic HomeFinder User's Guide," http://dq.com/homefind/dhuserg.htm, 22 pages.
Shneiderman, "Dynamic Queries for Visual Information Seeking", Nov. 1994, IEEE Software, pp. 70-77.

* cited by examiner

1100

Profile

File    Edit

Name: _____ 1110

Address: _____ 1115

Phone: _____ 1120

Email: _____ 1122

DOB: _____ 1125

Relationship Category: _____ 1130

Icon Image: _____ 1140

Audio Field: _____ 1145

Relations: _____ 1150

FIG. 11

RELATIONSHIP USER INTERFACE

TECHNICAL FIELD

Embodiments of the invention relate to the field of computing and more specifically, to a user interface for visualizing relationships and communicating.

BACKGROUND

Typically a person may organize associates (e.g., family, friends, co-workers, business associates, creditors, etc.) with a number of electronic software applications. These software applications may include an electronic address book, electronic mail, voice mail, etc. At times these tools may be integrated. For example, an electronic mail software application may be coupled with an electronic address book application to allow a person to auto-populate an electronic mail address field on the electronic mail software application with the electronic mail address of the associate with whom the user of the software would like to correspond.

In general, electronic mail software includes an inbox that displays unread e-mail in a list of received e-mail from various associates. The address book software application typically lists the associates alphabetically by last name.

A limitation of these software applications is that they have limited capability to organize and express personal relationships between the user and a variety of different types of associates. Furthermore, these software applications do very little to describe relationships the user might have with each associate. For example, as time goes by, the address book may include names of friends that may seem unfamiliar which may not have been used in quite some time. Some purposely and others unintentionally. These software tools do not include a way to help a user manage and nurture friendships.

BRIEF SUMMARY OF AN EMBODIMENT OF THE INVENTION

A user interface having a user icon and associate icons to visualize an interpersonal relationship and to communicate in order to nurture the relationship is described. In one embodiment of the invention, the user icon represents a user and the associate icons represent numerous associates. The associate icons are positioned radially about the user icon on the user interface to visualize a relationship between the user and each associate.

BRIEF DESCRIPTION OF THE DRAWINGS

The invention may best be understood by referring to the following description and accompanying drawings that are used to illustrate embodiments of the invention. In the drawings:

FIG. 11 illustrates one embodiment of an associate profile;

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

A user relationship software application having a user interface for visualizing interpersonal relationships is described. According to one embodiment of the invention, the user interface visualizes interpersonal relationships using a user icon to represent a user, and one or more associate icons to represent the associates having a relationship with the user of the user relationship software application. As will be described, the one or more associate icons may be positioned radially about the user icon to represent the state of the relationship between the user and each associate. In this way, the personal relationship between the user and each associate is visually displayed. As will be appreciated, the user may use the user relationship software application to identify strong and weak relationships, communicate with associates, and strengthen those relationships the user does not want to fade away.

The following description will be described showing the personal relationships of a user with friends, family, co-workers, acquaintances, etc. However, one of ordinary skill in the art will recognize that the user relationship software application may also be used to visualize numerous relationships of a user with, for example, clients, businesses, suppliers, and customers, among others. Therefore, it is understood that the invention is not limited to only the example described herein.

Figure 1:
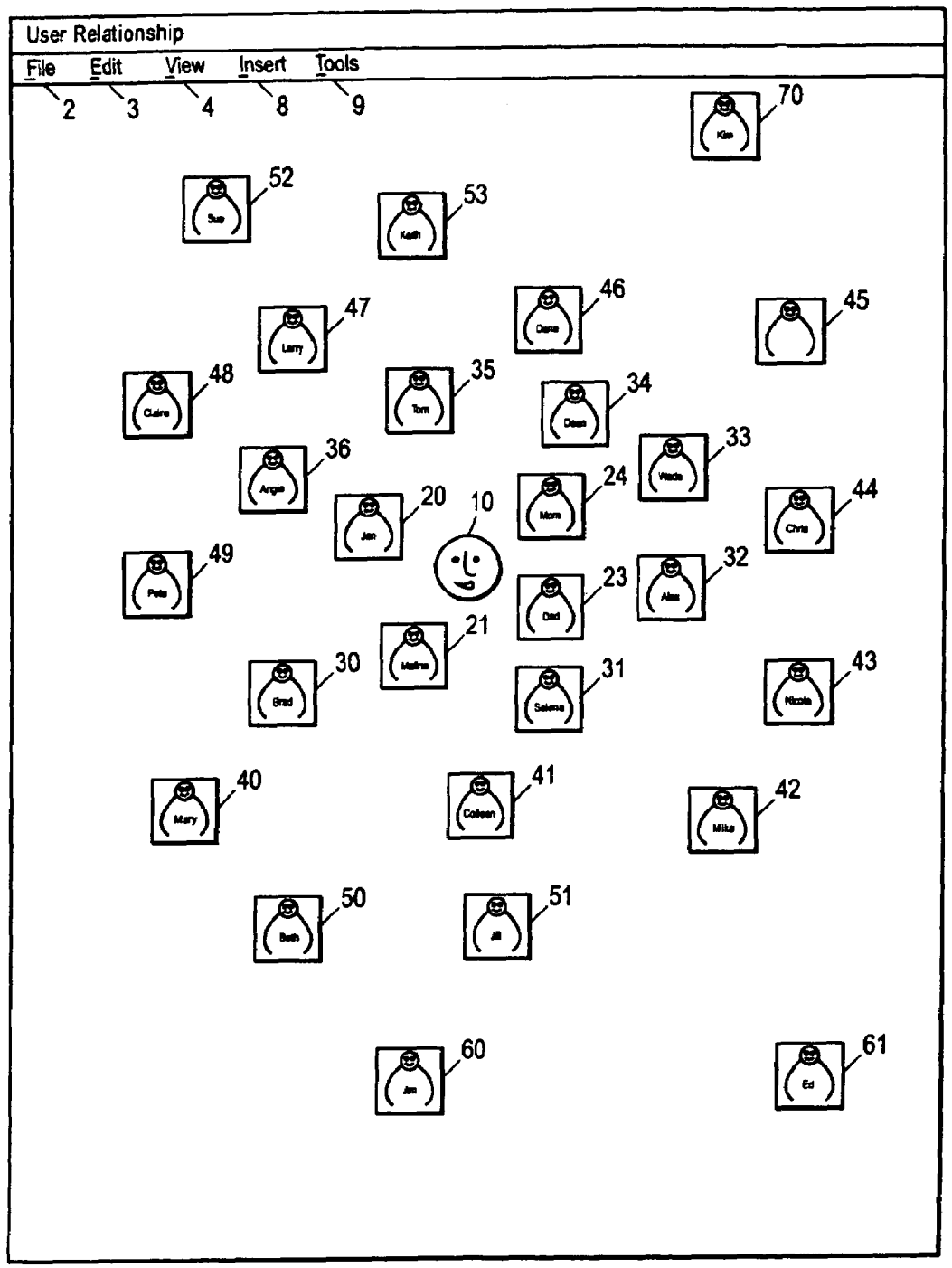
FIG. 1 illustrates one embodiment of a user interface having a user icon and associate icons.

FIG. 1 illustrates one embodiment of a user interface 5 for a computer system having a user icon 10 and associate icons 20–70. The user interface 5 allows a user to visualize the status of relationships with associates. On the user interface 5, user icon 10 represents the primary user of the user relationship software application. The associates are represented by associate icons 20–70. The associate icons 20–70 are radially positioned about the user icon 10. The user relationship software application allows a user to communicate (e.g., exchange communications and digital content) with each associate via electronic mail, voice communications, instant messaging, Internet chats, etc., as will be further described below.

The user icon 10 and each associate icon 20–70 may be configured with a unique icon and behavior to represent the user or associate. The unique icon may include a digital image, an animated character, text, etc. For example, a specific associate icon 20 may include a thumbnail image of the associate represented.

The user and associate icons may perform specific actions (including animation and audio actions) to indicate when an event occurs. For example, a specific associate icon may highlight, exhibit a smile, and/or play a specific song when a new communication is received from the associate associated with the associate icon. The user relationship software application allows the user to configure specific behavior to be associated with each icon, as will be described.

Figure 2:
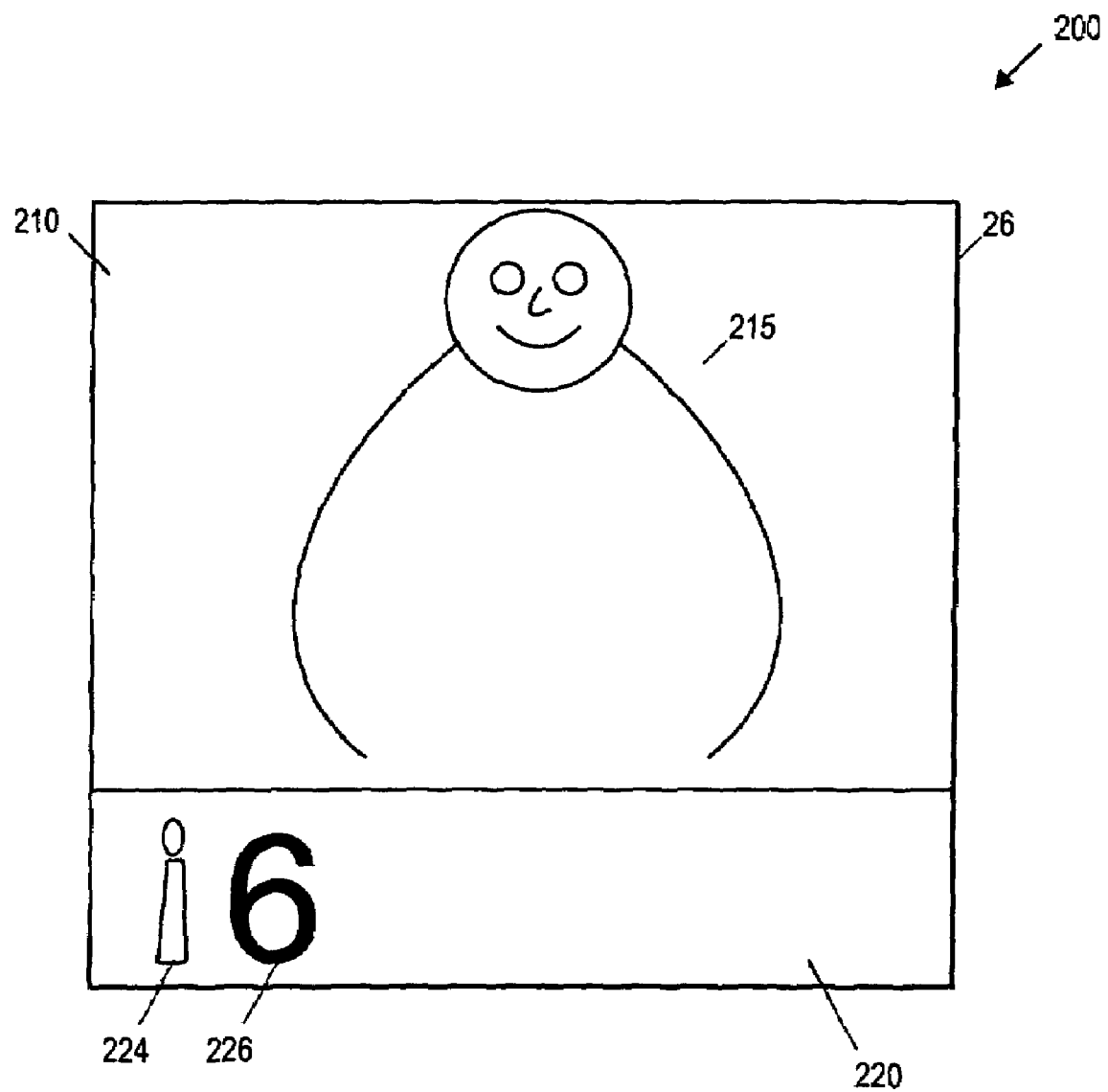
FIG. 2 illustrates one embodiment of an associate icon having a signal area.

In one embodiment, each associate icon may include a signal area to indicate communication exchanges and event reminders. FIG. 2 illustrates one embodiment of an associate icon 26 having a signal area 220. As shown, the associate icon 26 includes the signal area 220 appended to the bottom of an image 215 of an associate in an image area 210. However, one of ordinary skill in the art will recognize that the signal area 220 may be appended to the top, left, or right of the image area 210. In this embodiment, the signal area 220 includes a signal icon 224 and a countdown indicator 226. The signal icon 224 provides a visual representation of the event (e.g., candle represents a birthday). The countdown indicator 226 indicates the number of days until the happening of the event (e.g., six days until the birthday of the associate associated with associate icon 26). The user relationship software application may enable the user to predefine the amount of time before the countdown indicator 226 is displayed in the signal area 220 (e.g., the user may configure the user interface to only display the countdown indicator 226 within 7 days of the occurrence of a specific event).

It should be understood that the signal area 220 is not limited to the embodiments described herein. The signal area 220 may be displayed in different colors to indicate various events. In addition, the signal area 220 may include a visual representation of the signal icon 224 representing a received voice communication and a duration indicator (not shown) indicating the duration of the voice communication (e.g., 15 second communication). It should also be understood that the user may select an icon within the signal area 220 to retrieve communications, review a communication (e.g., read, listen to, view, etc), enter the blog (web log) of the selected associate, initiate the obtaining of a gift (e.g., view the associate's online wish list, gift registry or designated gifts to enable shopping for a gift associated with the special event), among other examples. A further description of the communication exchanges and notification of event happenings is described below.

In one embodiment, the closer an associate icon 20–70 is positioned relative to the user icon 10, the stronger the relationship between the user and associate associated with the associate icon 20–70. In contrast, the weakest relationships are visualized as those associate icons 20–70 that are further from the user icon 10. Also, the associate icons 20–70 positioned between the inner circle and the outer circle represents the relationships of variable importance.

For example, the associate associated with associate icon 20 is visualized to have a strong relationship with the user, while the associate associated with associate icon 50 is visualized to have a weaker relationship with the user than the associate associated with associate icon 20. Typically, associate icons 20–70 associated with immediate family members, close friends, and companions may be positioned closer to the user icon 10 to represent a strong relationship.

It should be understood that the invention is not limited to representing relationships radially about the user icon 10 at the center of the user interface 5. In an alternative embodiment, the user icon and the associate icons may be arbitrarily positioned on the user interface 5. For example, the user may decide the manner to visualize a relationship. In an alternative embodiment, the user icon may be located anywhere on the user interface 5 with the relationships located radially about. It should also be understood that in one embodiment, the user icon 10 is hidden and therefore is not visible on the user interface 5.

It should be appreciated that the user may manually drag and drop each associate icon 20–70 to a specific location on the user interface 5 for positioning. For example, the user may move associate icon 30, associated with an ex-roommate, further from the user icon 10 if the friendship ended badly.

Figure 3:
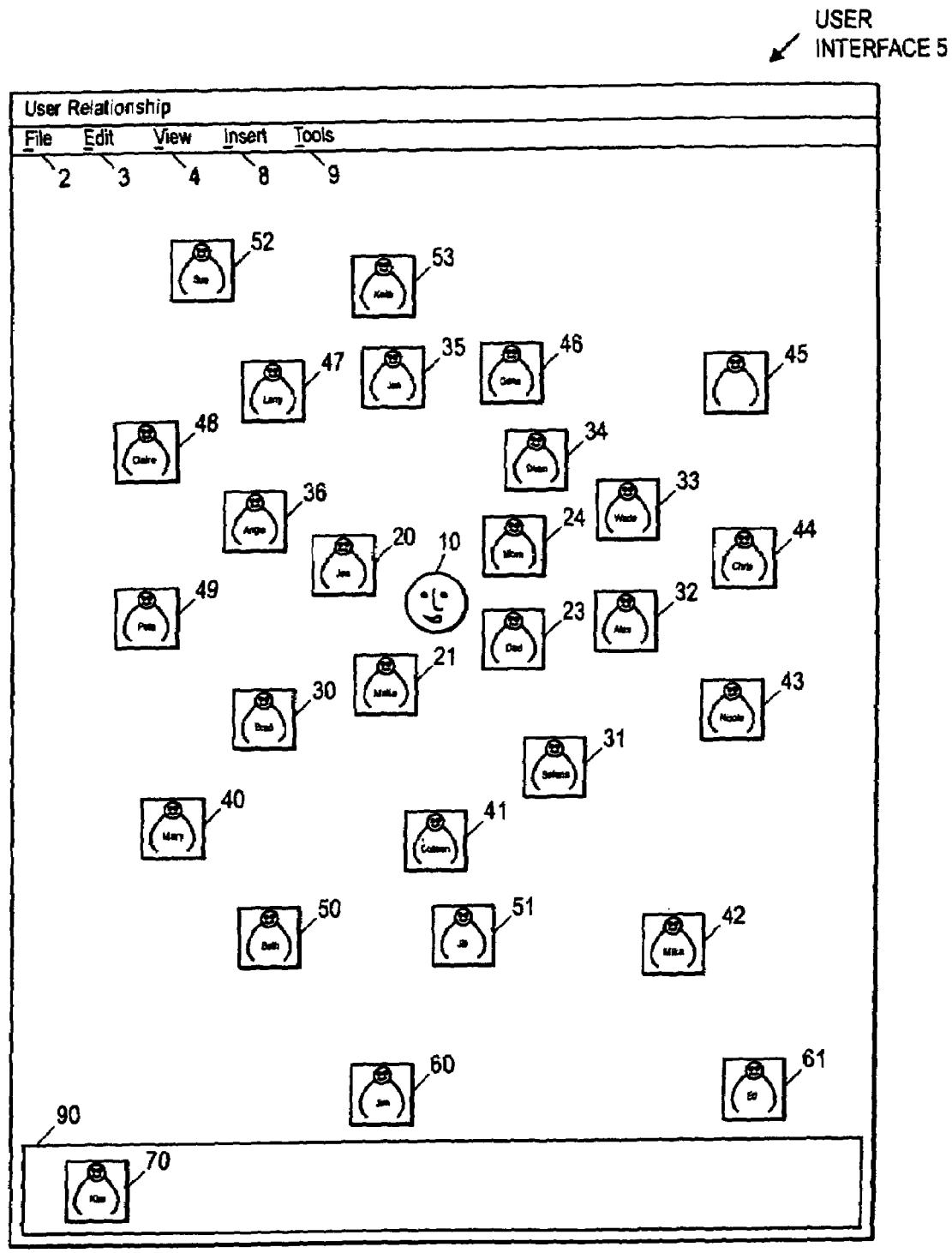
FIG. 3 illustrates one embodiment of a holding area and the user interface.

FIG. 3 illustrates one embodiment of a relationship user interface with a holding area 90. The user interface is capable of displaying a number of associate icons on the holding area 90 and not on the user interface 5. The user may manually drag and drop an associate icon from/to the holding area 90 to/from the user interface 5. In this way, the relationship user interface may be organized, manageable, and visually appeasing to the user.

For example, the user may choose to no longer have the associate icon of an old roommate, represented by associate icon 70, to show on the user interface, and may move the associate icon 70 to the holding area 90. In one embodiment, the holding area 90 may be hidden from view by a toggle that is controlled by the user. This may be beneficial if the user does not wish to delete the associate icon and its associated associate information, in order to keep the associate information. In one embodiment, the associate icon may automatically be positioned back onto the user interface 5 if the user receives a communication from the user. However, the relationship user interface may also be configured to block the receipt of any communication received from the associate.

Figure 4:
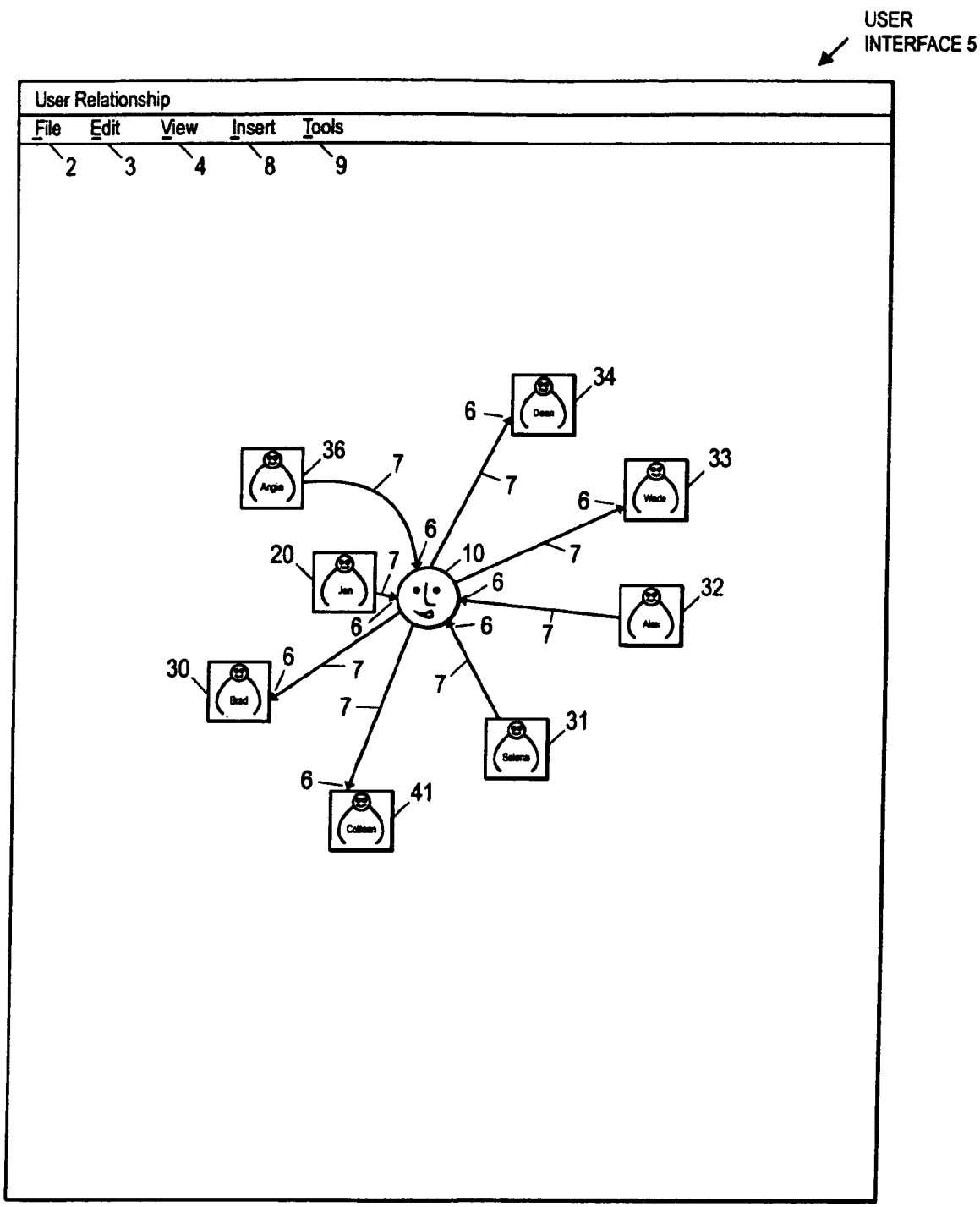
FIG. 4 illustrates one embodiment of the user interface having ties.

In one embodiment, the relationship user interface may be configured to display ties. Each of the associate icons has a tie 7 connecting the associate icon and the user icon 10, as illustrated in FIG. 4. In one embodiment, the user may right-click on a tie 7 to display a brief interaction history between the two icons (e.g., show if the user sent/received the last interaction, a date of interaction, and a number of days between interactions).

The direction of the arrows 6 also visualizes which party made the last communication. For example, the arrow 6 associated with associate icon 31 visualizes that associate icon 31 was the last to initiate a communication with the user, while the arrow 6 associated with associate icon 33 visualizes that the user was the last to initiate a communication with the associate associated with associate icon 33.

Figure 5:
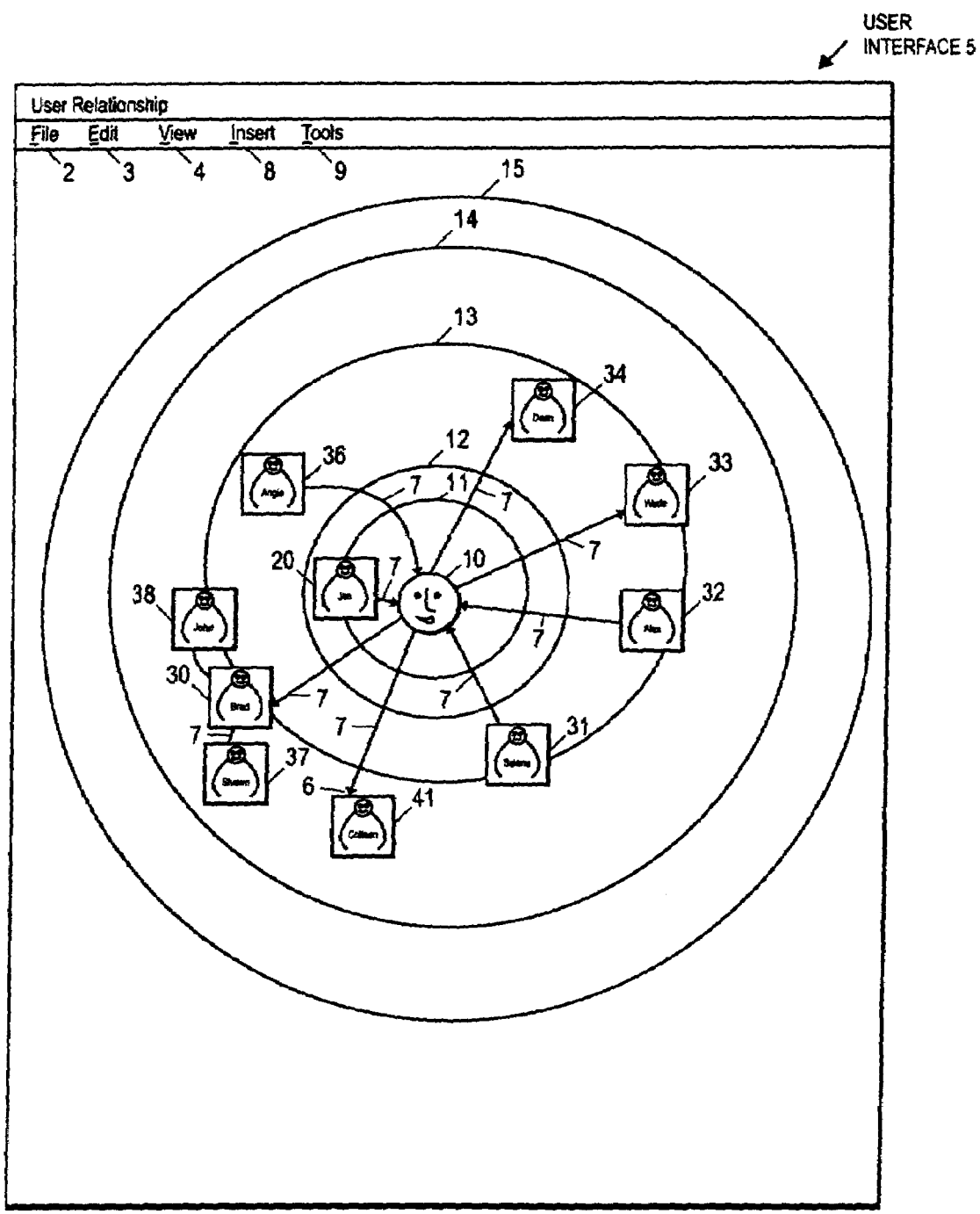
FIG. 5 illustrates one embodiment of the user interface showing a sub-relationship.

FIG. 5 illustrates one embodiment of a user interface showing a sub-relationship. The tie 7 between two associate icons may represent a sub-relationship. The associate icon 30 has ties 7 with associate icon 37 and associate icon 38 which represents a sub-relationship. For example, this sub-relationship may be a parent-child relationship. In one embodiment, sub-relationships are hidden from view on the user interface 5 unless the user positions the cursor over an associate icon having a sub-relationship, causing the other associate icons to be displayed. For example, upon positioning the cursor over the associate icon 30 (e.g., a co-worker who is a parent), the associate icons 37 and 38 are displayed (e.g., the children of the co-worker represented by associate icon 30).

In addition, FIG. 5 illustrates the user interface 5 having rings 11–15. The position of an associate icon 20–70 relative to one of the rings 11–15 may assist the user in visualizing the importance of a relationship. For example, the importance of a relationship may also be represented by the most important relationships being within ring 12. Associate icons outside of the inner ring 12 are visualized as weaker relationships (e.g., the associate icons 20–70 that are positioned nearer to the outer ring 15). The user may also toggle the viewing of the rings 11-15 to appear or be hidden.

Figure 6:
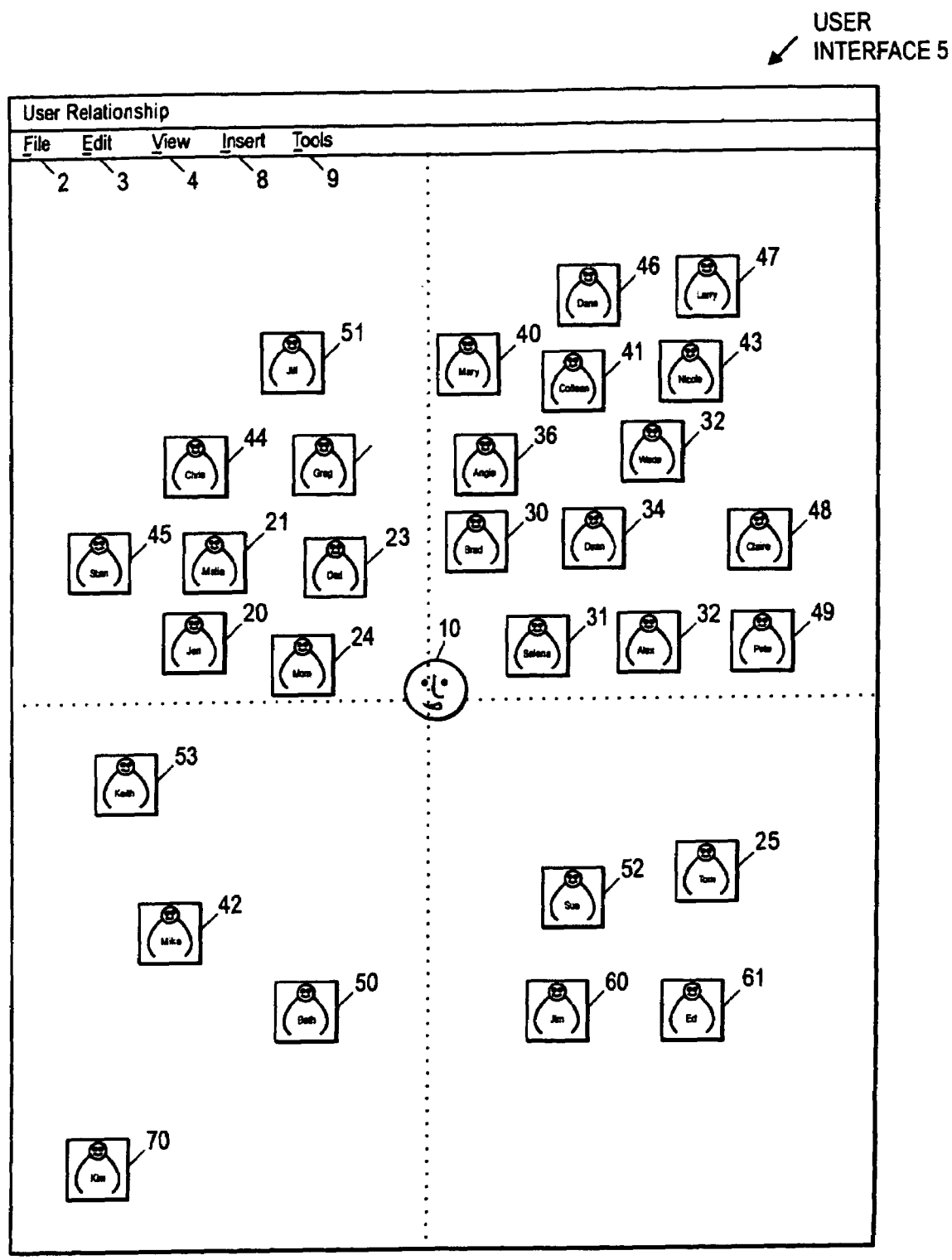
FIG. 6 illustrates one embodiment of arranging associate icons into quadrants.

It should be understood that all the associate icons may be displayed in alternative arrangements and also need not be displayed at once. FIG. 6 illustrates one embodiment of arranging associate icons 20–70 by categories and quadrants upon the user interface 5. In this way, the user interface 5 is capable of organizing the associate icons 20–70 radially about the user icon 10 wherein the associate icons associated with similar relationship categories are grouped together. As illustrated in FIG. 6, associate icons categorized as the family members are grouped in the northwest quadrant; associate icons categorized as friends are grouped in the northeast quadrant; associate icons categorized as co-workers/business relationships are grouped in the southeast quadrant; and all other icons are grouped in the southwest quadrant. Similarly, in one embodiment, the associate icons are arranged within specific radial positions about the user icon based on the relationship category or other factors.

Figure 7:
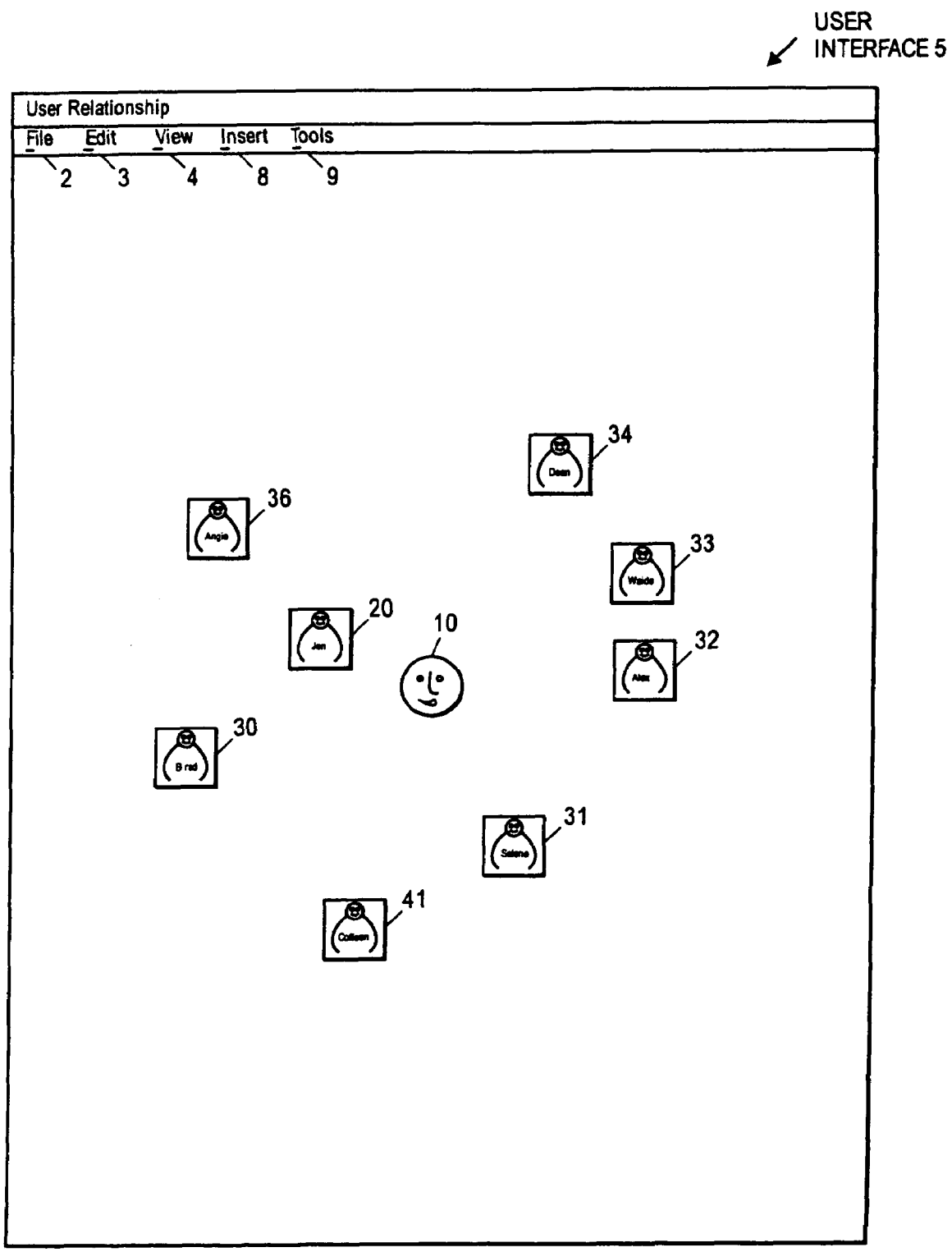
FIG. 7 illustrates one embodiment of the arranging associate icons by category.

In one embodiment, the user relationship software application may be configured by the user to only display specific associate icons 20–70. FIG. 7 illustrates one embodiment of the user interface 5 displaying only the associate icons 20–70 that are categorized as close friends. The user may select one of many possible views by selecting the view menu 4.

In one embodiment, the associate icons 20–70 may have different colors, sizes, shapes, and behavior to represent associate icons of different relationship categories. For example, each associate icon representing an immediate family member may be represented with the color orange; each associate icon representing a distant family member may be represented with the color green; each associate icon representing a co-worker may be represented with the color blue; and each associate icon representing a bowling team member may be represented with the color aqua blue. The user relationship software application provides a means to associate each associate icon 20–70 with a relationship category, as will be further described below.

In one embodiment, the size of the associate icon 20–70 may also represent the importance of a relationship. The size of the associate icon 20–70 may adjust depending on the position of the associate icon 20–70 relative to the user icon 10. For example, the size of the associate icon 20–70 may appear smaller as it is positioned further relative to the user icon 10 and larger if the associate icon 20–70 is positioned closer relative to the user icon 10.

In one embodiment, a user (or associate) may configure a user icon 10 or associate icon 20–70 to exhibit behavior such as to show an emotional state (e.g., a red overlay to show anger). Also, the associate icons having happy, sad, or mad faces may also represent the status of a relationship or the timeliness of response. The expectation for response can be set in various ways, as will be further described below. The associate icons 20–70 may be happy faces or an actual person's image.

In one embodiment, the associate icons 20–70 may exhibit behavior to indicate availability. For example, an associate icon 20–70 may show a hand signal to indicate that it is busy and cannot be interrupted. Therefore, the associate has the capability to control the behavior of the related associate icon 20–70 on the user interface 5.

In turn, the user may control the behavior of their related icon on a remote device. In one embodiment, the user relationship software application enables a user to selectively signal availability to partake in a real-time communication session (e.g., instant messaging session, network chat, etc.) or signal an associate of unavailability. For example, the user represented as an associate icon 20–70 on the user interface 5 of a family member may exhibit behavior indicating that the user is available to communicate in an instant messaging session, while the user represented as an associate icon 20–70 on the user interface 5 of a co-worker may exhibit behavior indicating that the user is not available to communicate in an instant messaging session. In one embodiment, the user can set access by the rings 11–15 (e.g., allow associates within ring to interrupt, but no one else).

It should be understood that by controlling the behavior indicating availability the user restricts communication access to selected associates. For example, the user may restrict the display of communications received from associates positioned outside the inner two rings on the user interface, and thereby the user is open to receiving communications only from associates within the inner two rings. In one embodiment, upon determining which associates to restrict, the user interface 5 does not notify the user of communications received from a restricted associate until the restriction is removed. In one embodiment, upon restricting an associate, the user interface 5 of the associate will not allow the restricted associate to transmit a communication to the user until the restriction is removed. One of ordinary skill in the art will recognize that the access control is not limited to selecting associates to restrict. Alternatively, the user may select only those associates to be allowed access.

Figure 8:
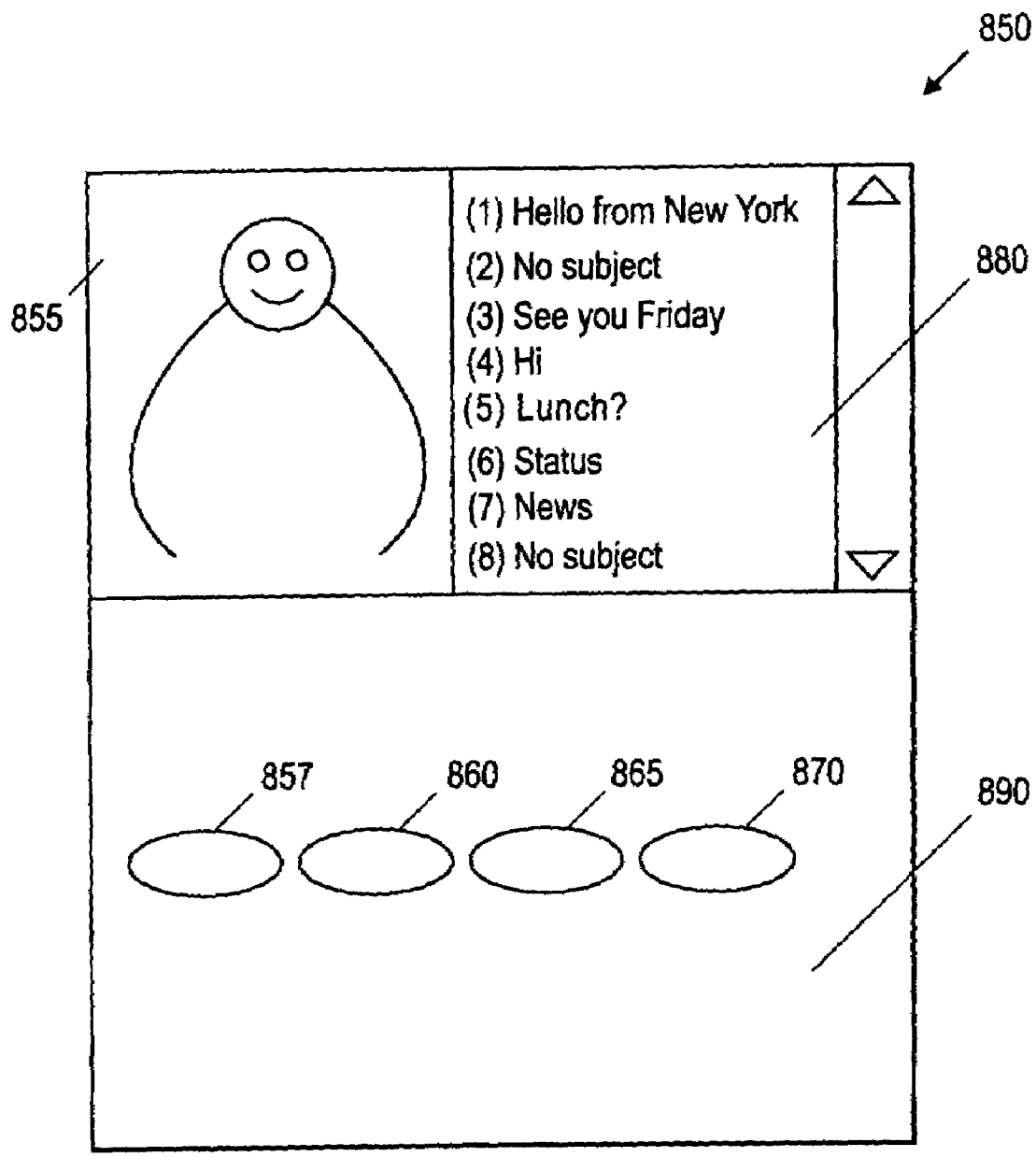
FIG. 8 illustrates one embodiment of a voice communications tool.

In one embodiment, upon selecting (e.g., performing a single click on) an associate icon 20–70, a voice communication tool is immediately displayed. FIG. 8 illustrates one embodiment of a voice communication tool 850. The voice communication tool 850 enables a user to transmit a voice communication to the selected associate. The voice communication tool 850 includes an associate icon section 855, an associate communication section 880, and a communication control section 890.

The associate icon section 855 includes an icon (e.g., an image) of the selected associate. If multiple associate icons are selected to be sent the voice communication, the icons for each recipient will be displayed in the associate icon section 855. Multiple associate icons 20–70 may be chosen individually (e.g., by selecting each associate icon 20–70 while the voice communication tool 850 is open) or by selecting a designated pre-defined relationship category (e.g., selecting a relationship category makes all members of the group a recipient of the communication).

The associate communication section 880 includes a list of the voice communications received and sent between the user and the selected associate. In one embodiment, the voice communications received from the selected associate are displayed differently from the communications sent to the associate. For example, voice communications received from the selected associate may be displayed as light blue and the voice communications sent to the selected associate may be displayed as dark blue in the associate communication section 880. These voice communications may be annotated as will be further described below. The user may select a specific voice communication to playback.

The communication control section 890 includes a send button 857, a play button 860, a mute button 865, and a stop button 870. The send button 857 enables the user to send a voice communication (e.g., a real-time voice communication, a digital audio file, etc.) via a microphone to the selected associate. The mute button 865 enables the user to mute the microphone. The play button 860 enables the user to playback a selected received and sent voice communication listed in the associate communication section 880. The stop button 870 enables the user to end a voice communication or to stop playback of a received voice communication. However, in one embodiment, the user may stop recording a voice communication by pressing the send button 857, which sends the voice communication.

In one embodiment, the voice communication tool 850 may transmit a voice communication to a selected associate via voice commands. For example, the voice communication tool 850 may automatically appear upon the user speaking the name of an associate into the microphone. The voice communication tool 850 will automatically initiate a voice communications session as if the user had selected the play button 860. This way, the user may immediately speak the desired voice communication. Upon completing the voice communication, the user may say the word "send" into the microphone and the voice communication tool 850 will automatically send the voice communication to the selected associate.

In one embodiment, the user can select (e.g., single click) on an associate icon and begin automatically recording a voice communication. The voice communication tool 850 begins to record the communication immediately, without the need to select any other interface element (e.g., the send button 857, etc). While the user is still in recording mode, she can select the send button 857 to end the recording and transmit the communication (e.g., transmit a digital file of the voice communication) to the selected associate. In this way, the user can transmit a voice communication to a selected associate immediately, for example, within two clicks of an input device.

The voice communication may be transmitted as an analog signal or a digital signal. The voice communication may be a digital audio file that includes a text subject line. In one embodiment, if the user does not enter a text subject title, the voice communication tool 850 may automatically create a text subject line from the first few words of the audio file. In another embodiment, at any point during recording the voice communication, the user could issue a voice command such as "subject" and then whatever is said afterwards is converted into the subject line text by the voice communication tool 850.

It should be understood that the voice communication tool 850 is not limited to the functions as described. In an alternative embodiment, additional functionality may be added. For example, the voice communication tool 850 may include a function to allow a user to select background music to be sent in conjunction with a voice communication. The voice communication tool 850 may also enable the user to vary the volume and pace of the background music. The voice communication tool 850 may also allow for the background music to be added during recording of the voice communication or after the recording of the voice communication.

Figure 9:
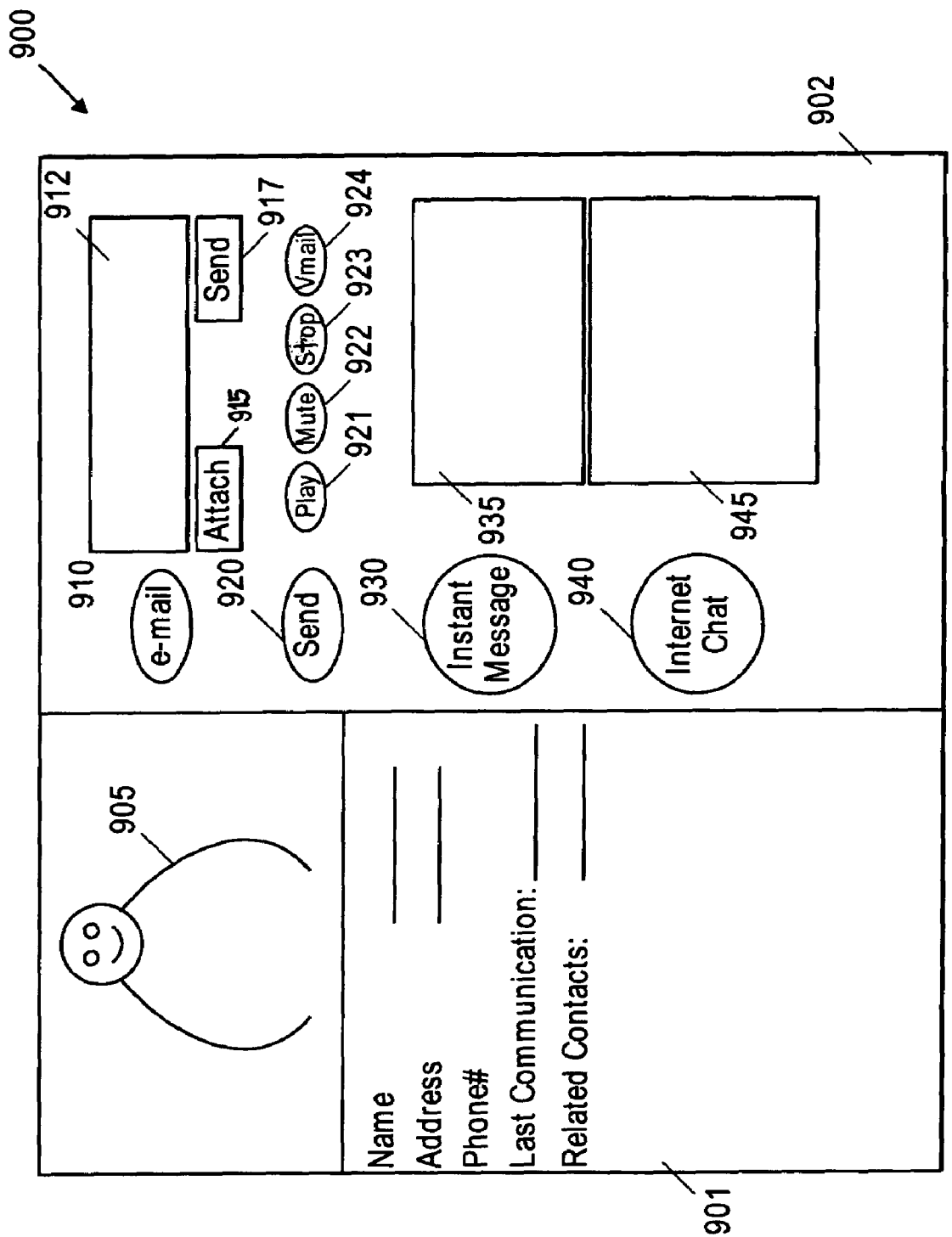
FIG. 9 illustrates one embodiment of a communication tool.

FIG. 9 illustrates one embodiment of a communication tool 900. Upon double-clicking on an associate icon 20–70, the communication tool 900 is displayed to allow the user to initiate a communication exchange with the associate associated with the selected associate icon 20–70. The communication tool 900 includes an associate information section 901 and a communications section 902.

The associate information section 901 includes an associate image 905 and associate information of the associate associated with the selected associate icon 20–70 such as an associate name, an associate address, an associate phone number, the date of the last communication with the associate, and any related associates. The image of the associate may exhibit specific behavior to represent a status of the relationship as described above (e.g., smiling, size of picture to represent the amount of time between interactions, the frame color and/or size, etc.).

In one embodiment, if a received email includes additional recipients, the associate information section 901 may show an associate icon 20–70 (e.g., an image) associated with each of the recipients.

The communications section 902 includes an e-mail button 910, a send button 920, an instant messaging button 930, and an Internet chat button 940.

The e-mail button 910 initiates software instructions to allow the user to read, view, compose, and send an electronic mail communication to the associate associated with the selected associate icon 20–70. The electronic mail communication (including attachments) may be composed or read from text box 912. In one embodiment, the communication tool 900 enables a user to change the size and animation of a text communication to convey emotions (e.g., humor, happiness, sadness, etc.). The user may also attach digital content to the communication by pressing the attach button 915. The digital content may include a digital music file, a digital document, a digital audio file, a digital video file, a digital image, or a digital slideshow, among other examples. The user may also view received digital content.

The user relationship software application may use Post Office Protocol ("POP"), POP version 3, Internet Mail Access Protocol ("IMAP"), and/or Simple Mail Transfer Protocol ("SMTP"), among other electronic mail protocols well known to those of ordinary skill in the art.

In one embodiment, the e-mail button 910 may initiate a third party e-mail client, such as Microsoft Outlook® from Microsoft Corporation of Redmond, Wash. Netscape Messenger® from America Online Inc of Dulles, Va.; or Eudora® from Qualcomm Incorporated of San Diego, Calif., among others.

The send button 920 initiates software to transmit a voice communication with the associate associated with the selected associate icon 20–70. The send button 920 enables the user to transmit a voice communication (e.g., a real-time communication, a digital audio file, etc.) via a microphone to the selected associate. The voice mute button 922 enables a user to mute the microphone. The voice play button 921 enables the user to playback a selected received voice communication. The voice stop button 923 allows the user to end a voice communication with the associate or to stop the playback of a received voice communication. The voice mail button 924 may enable the user to listen to voice mail communications sent by the associate associated with the selected associate icon 20–70. It should be appreciated that the communication tool 900 may also include an associate communication section similar to associate communication section 880 in FIG. 8.

The instant messaging button 930 enables the user to initiate an instant message session with the associate associated with the selected associate icon 20–70. The user may read and compose instant message communications from text box 935 and text box 945, respectively. The user may also view received digital content.

In one embodiment, the instant message session may open a communication session with third party instant message software clients such as Yahoo!® Messenger of Yahoo!Inc. of Sunnyvale, Calif.; MSN Messenger of Microsoft® Corporation of Redmond, Wash.; or AOL® Instant Messenger™ of America Online, Inc. of Dulles, Va., among others.

The Internet chat button 940 enables the user to initiate an Internet chat session with the associate associated with the selected associate icon 20–70. The user may read and compose Internet chat messages from text box 935 and text box 945, respectively. The user may also view received digital content.

It should be understood that the user is not limited to communicating with only the selected associate. Alternatively, the user may communicate with multiple associates or a group of associates simultaneously. For example, in one embodiment, for each associate to be sent an electronic mail communication and/or voice communication, an image of each associate appears on the associate information section 901. It should be understood that the term "voice communication" is not limited to the voice of the user and associates but may also include any audio to be communicated such as music, babies, pets, etc.

In one embodiment, the user relationship software application tracks' the grouping of multiple associates being sent a communication over time. The user relationship software application may then propose additional associates to send the communication to and/or automatically infer which other associates the user is likely to select. In one embodiment, when a user clicks on an associate icon and holds the mouse down, the user relationship software application infers that the communication will go to that associate's entire family.

In one embodiment, the user relationship software application enables a user to drag selected associate icons into a special communication area (not shown) of the user interface 5 to enter into a private chat (e.g., real-time, message board, etc.). The user may also drag an associate icon out of the special communication area to remove the associate from the private chat. The user may also drag digital content into the special area to transmit the digital content to all those in the private chat.

It should also be understood that the invention is not limited to the communication techniques described herein. In alternative embodiments, other communication techniques, such as video communication may also be implemented. In one embodiment, the communication tool 900 includes an electronic calendar feature to enable a user to update a calendar event, such as a meeting, an appointment, birthdays, anniversaries, etc. In one embodiment, the user may access the electronic calendar by right-clicking on the user icon 10 and selecting a calendar option or selecting it from the file menu 2.

In one embodiment, the user relationship software application may be configured to automatically send a copy of digital content to an associate. For example, the user may drag a copy of the digital content onto the associate icon 20–70 in order to send the digital content, upon which the digital content will be automatically sent via electronic mail to the associate associated with the associate icon 20–70. Alternatively, to send digital content, the user may click inside an open document (or document icon) and then click on the desired associate icon 20–70 in the user interface 5.

In one embodiment, if digital content and a communication are sent in close time proximity, the user relationship software application will attach the digital content and communication as a single communication. For example, the user relationship software application may conclude that transmissions sent within a predetermined amount of time (e.g., two minutes) of each other are related, such as a digital photo and a voice communication. The user relationship software will attach the digital photo to the voice communication and transmit them both as one communication. In this way, a user need not manually attach digital content to a file and this allows for a quick transmission of digital content.

It should be appreciated that the user relationship software application notifies the user upon the happening of an event, such as a user activity event or an associate activity event. An associate activity event may include receiving an electronic mail communication, a voice communication, an instant message communication, an indication of an online photo album update, indication of a blog (web log) update, etc. The user activity event may include a notification of a meeting time approaching, a reminder of a birthday or anniversary, an upcoming task due date, etc.

Figure 10:
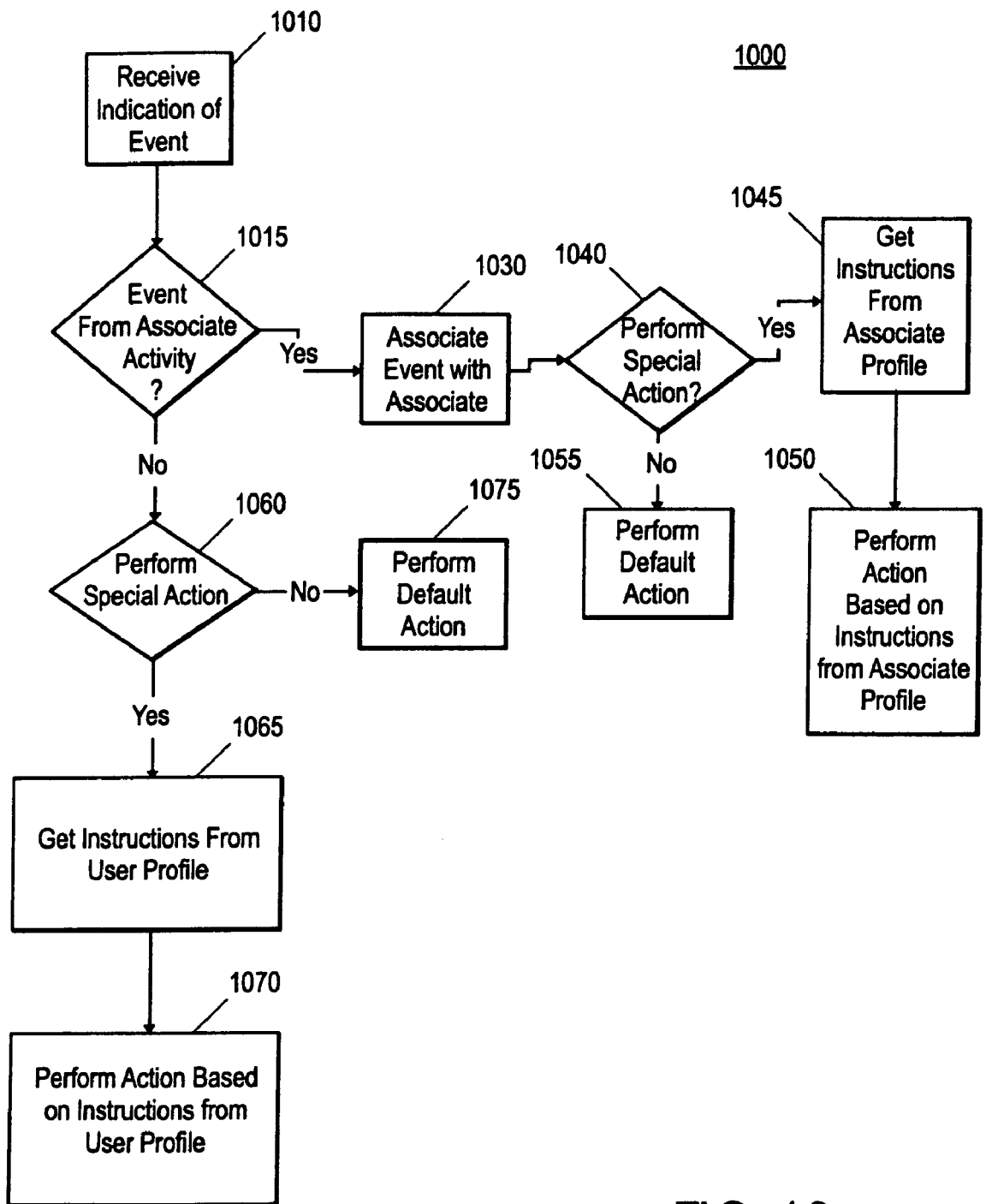
FIG. 10 illustrates one embodiment of a process flow of the user interface to receive a notification of an event.

FIG. 10 illustrates one embodiment of a process flow 1000 for user interface 5 receiving a notification of an event. At block 1010, the user relationship software application receives an indication of an event. For example, the user relationship software application may receive an indication of a user activity event or associate activity event.

At block 1015, the user relationship software application determines whether the event is based on an associate activity. If the event is based on an associate activity, control passes to block 1030. If the event is not based on an associate activity, control passes to block 1060.

At block 1030, the user relationship software application associates the event with an associate profile. The user relationship software application may identify the associate by a recipient e-mail address, an instant message identifier, a caller identifier, etc.

At block 1040, the user relationship software application determines whether the associate profile associated with the event includes instructions to perform specific actions upon the happening of the event. For example, the associate profile may include instructions to playback a specific audio file upon receiving a communication from a specific associate; or animate the associate icon related to the received communication. If the associate profile includes instructions associated with the event, control passes to 1045. If the associate profile does not include instructions associated with the event, control passes to block 1055.

At block 1045, the user relationship software application receives the instructions associated with the event from the related associate profile.

At block 1050, the user relationship software application performs the action based on the instructions. For example, the instructions may direct the user relationship software application to highlight, flash, and/or append an icon to the signal area of the associate icon 20–70 associated with the associate upon receiving an electronic mail communication from the associate. Also, the instructions may direct the user relationship software application to animate the associate icon 20–70 associated with the associate to smile, show an image of the associate dancing, append an icon to the associate icon, etc.

At block 1055, the user relationship software application performs a default action associated with the event. For example, a default action associated with receiving an electronic mail communication may be to highlight, animate, append an icon to the signal area of the associate icon 20–70, or playback audio related to a user activity event, among other examples.

Referring back to block 1060, the user relationship software application determines whether the user profile includes instructions to perform a specific action based on the received user activity event. If the user profile includes instructions based on the event, control passes to block 1065. If the user profile does not include instructions based on the event, control passes to block 1075.

At block 1065, the user relationship software application receives the instructions associated with the event from the user profile.

At block 1070, the user relationship software application performs the action based on the instructions. For example, the instructions may direct the user relationship software application to animate, highlight, append an icon to the signal area of the user icon, or flash the user icon upon receiving an indication that a business meeting is to occur in thirty minutes. Also, the instructions may direct the user relationship software application to animate the user icon to display a specific image of a "brown lunch bag" when it is lunchtime.

At block 1075, the user relationship software application performs a default action associated with the event. For example, a default action associated with receiving a calendar reminder may be to highlight or animate the user icon, append an icon to the signal area of the user icon, or to play a specific audio file, among other examples.

In one embodiment, the user relationship software application indicates brief information about the event notification as text, voice, or as a digital photo. For example, if the event is the receiving of a voice communication from an associate, the related associate icon 20–70 displays "voice communication" and the length of the voice communication in seconds in the signal area as described above.

Upon selecting (e.g., manually or upon voice activation) the associate icon 20–70 or user icon 10 (including the related signal area of the selected associate icon or user icon) the user may access a source related with the event. For example, upon selecting the associate icon 20–70 related to an associate activity event, the user may playback a received or sent voice communication, communicate in real-time with an associate(s), read an electronic mail communication, instantly view a digital photo or digital document, etc. Alternately, a dialogue box may appear prompting the user for the manner in which they would like to view or play a digital content file.

Upon receiving a voice communication, the user may also add an annotation to the communication. For example, a received voice communication or e-mail may include an annotation box that the user may use to annotate the voice communication. In this way, the annotated communication may appear when a user places a cursor over the stored communication, such as that described above in reference to associate communication section 880.

The user may also flag the communication to be added to an electronic scrapbook. The electronic scrapbook is a repository of common communications presented, for example, to commemorate a specific event or person. In this way, the user may organize and view communications having special meaning without having to search multiple communications.

The user relationship software application allows a user to delete, insert, and modify an associate icon 20–70 from the user interface 5. A user may delete or modify an associate icon 20–70 from a selection on the edit menu 3. Alternatively, a user may delete an associate icon 20–70 by selecting the associate icon 20–70 with the cursor and pressing the delete key.

The user may insert a new associate icon onto the user interface 5 by making a selection on the insert menu 8, which will display an associate profile 1100. As will be described, the associate profile 1100 stores information about a specific associate. In one embodiment, the associate profile 1100 is displayed to collect information about a specific associate after the user drags a digital image of the specific associate (from either inside or outside the user relationship software application user interface 5) and drops the digital image onto the user interface 5.

FIG. 11 illustrates one embodiment of the associate profile 1100. The associate profile includes fields to store associate information, such as in an associate name field 1110, an associate mailing address field 1115, an associate phone number field 1120, an associate electronic mail address field 1122, an associate birth date field 1125, an associate category field 1130, an associate image field 1140, an associate audio field 1145, and an associate relations field 1150. One of ordinary skill in the art will recognize that the invention is not limited to the fields described herein and additional fields may be included that are not described here so as to not obscure the description of the invention.

The associate name field 1110 stores a name of the associate associated with an associate icon 20–70.

The associate mailing address field 1115 stores a mailing address of the associate associated with an associate icon 20–70.

The associate phone number field 1120 stores a phone number of the associate associated with an associate icon 20–70.

The associate electronic mail address field 1122 stores an electronic mail address of the associate associated with an associate icon 20–70.

The associate birth date field 1125 stores a birth date of the associate associated with an associate icon 20–70.

The associate category field 1130 stores a relationship category associated with the associate associated with an associate icon 20–70. For example, the associate may be categorized as an immediate family member (e.g., parents, brother, sister, children, etc.), a close friend, a co-worker, a new acquaintance, etc.

The associate image field 1140 stores a name and location of an image file to be used to associate an image with the associate icon 20–70. For example, a user may associate an image (e.g., jpeg file, etc.) of her mother on the associate icon associated with her mother. The associate image field 1140 may also include instructions to have the image perform specific actions upon the happening of an associate activity event. For example, the associate icon 20–70 may include an image which will express happiness (e.g., a happy face), sadness (e.g., a sad face), or annoyance (e.g., an angry face) according to a variable such as timeliness of response. In this example, the associate image field 1140 may also include an expected response timeframe for a communication from the associate, or include how quickly a user should reply to a communication sent from the associate. In this way, the user interface visualizes an emotion of which associates are communicating and which associates are not communicating over a period of time.

If the associate image field 1140 is empty, the user relationship software application will display a default icon.

The associate audio field 1145 stores a name and location of an audio file associated with the associate icon 20–70 to be played upon the happening of a specific associate activity event. For example, a user may associate an audio file (e.g., mpeg, wav, etc.) of her mother saying "hello" upon receiving a communication from her mother.

If the associate audio field 1145 is empty, the user relationship software application will playback a default audio file.

The associate relations field 1150 is the name of an additional associate that is related to the associate. For example, an associated associate may be a child of the associate.

One of ordinary skill in the art will recognize additional techniques to insert new associate information and the invention is not limited to the techniques described herein. For example, in one embodiment the association information for a new associate may be imported (e.g., based on the associates email address) from a remote database containing associate information.

It should be understood that the associate profile 1100 is not limited to the fields described herein. In alternative embodiments, additional fields may be added to the associate profile 1100. For example, the associate profile 1100 may include a target frequency of contact field, which stores a number of communications a user expects to receive from the related associate within a specific time frame. In this way, the user relationship software application may track the number of communications between the related associate and the user, and notify the user of compliance or non-compliance with the goal.

In one embodiment, the associate icons 20–70 may also change if there is lack of interpersonal contact. For example, the related associate icon 20–70 may turn from color to black and white, to just an outline, shrink, or the border around the associate icon may change in color. In one embodiment, the associate icons 20–70 may automatically reposition based on the amount of interpersonal contact, as will be further described below.

Figure 12:
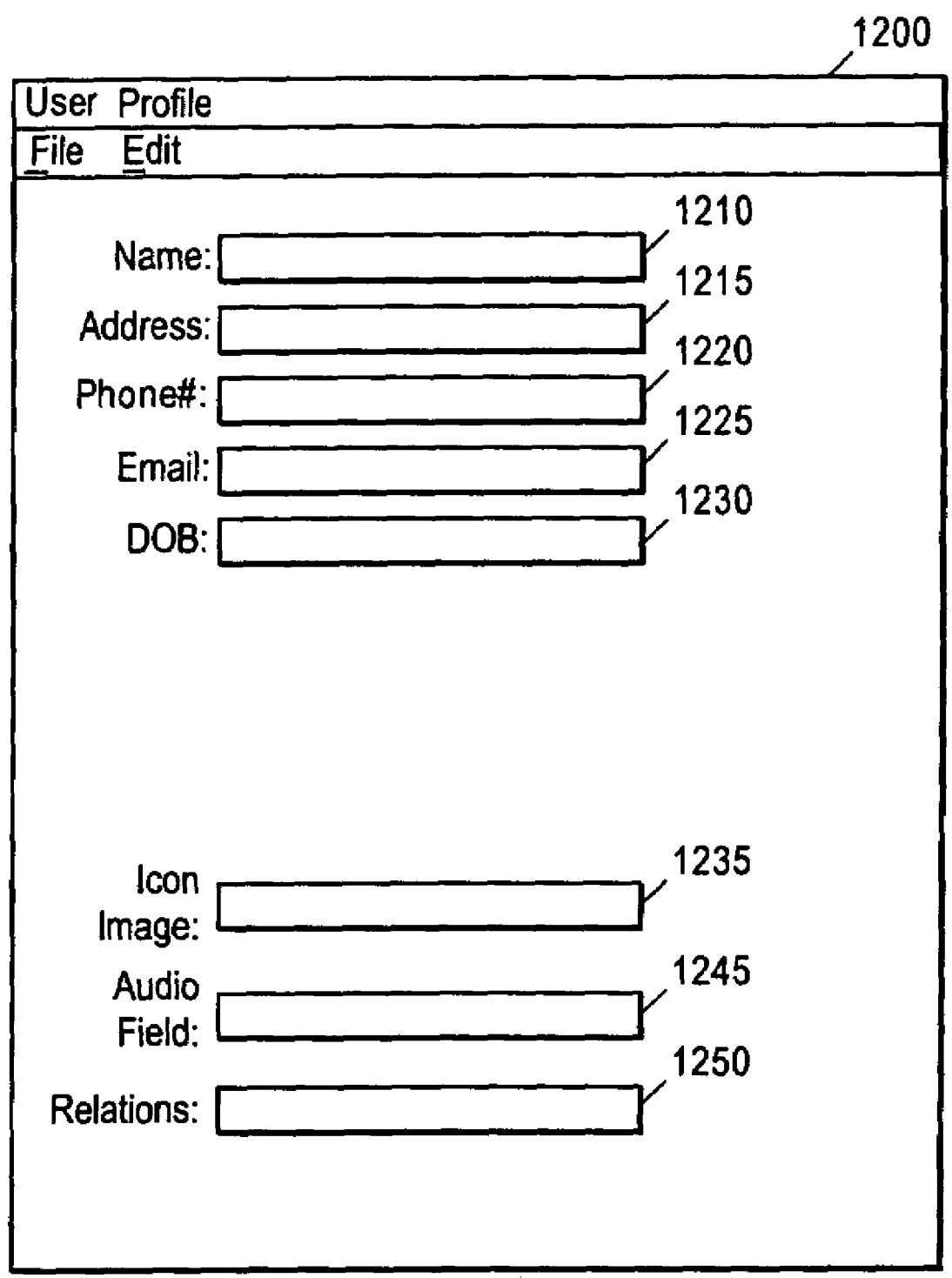
FIG. 12 illustrates one embodiment of a user profile.

FIG. 12 illustrates one embodiment of a user profile 1200. The relationship user interface is capable of modifying user information and the user icon 10 via the user profile 1200. As will be shown, the user profile information may be exchanged with associates to become associate information on the user relationship software application used by the associate. The user profile includes fields to store user information, such as a user name field 1210, a user mailing address field 1215, a user phone number field 1220, a user electronic mail field 1225, a user birth date field 1230, a user image field 1235, a user audio field 1245, and a user relations field 1250.

The user name field 1210 stores a name of the user associated with the user icon 10.

The user mailing address field 1215 stores a mailing address of the user associated with the user icon 10.

The user phone number field 1220 stores a phone number of the user associated with the user icon 10.

The user electronic mail address field 1225 stores an electronic mail name of the user associated with the user icon 10.

The user birth date field 1230 stores a birth date of the user associated with the user icon 10.

The user image field 1235 stores a name and location of an image associated with the user associated with the user icon 10. For example, a user may associate an image (e.g., jpeg file, etc.) of herself. The user image field 1235 may also include instructions to perform specific actions upon the happening of a user activity event. This image may also be used to represent the user as an associate on the user relationship application software of another associate, as will be further described below for FIG. 13.

If the user image field 1235 is empty, the user relationship software application will display a default icon.

The user audio field 1245 stores a name and location of an audio file associated with the user icon 10 to be played upon the happening of a specific user activity event. For example, a user may associate an audio file (e.g., mpeg, wav, etc.) of a dinner bell ringing at dinnertime.

If the user audio field 1245 is empty, the user relationship software application will playback a default audio file.

The user relations field 1250 is the name of an additional associate that is related to the user. For example, a related associate of the user may be a child of the user.

The user profile information and/or associate profile information may be stored in a local server or on a remote server across a network. In one embodiment, the associate profile information is displayed automatically when the user places the cursor over a related associate icon. In one embodiment, a photo album, a web page, or a blog (e.g., a web log stored on a network) of an associate may be presented upon selecting the related associate icon 20–70.

Figure 13:
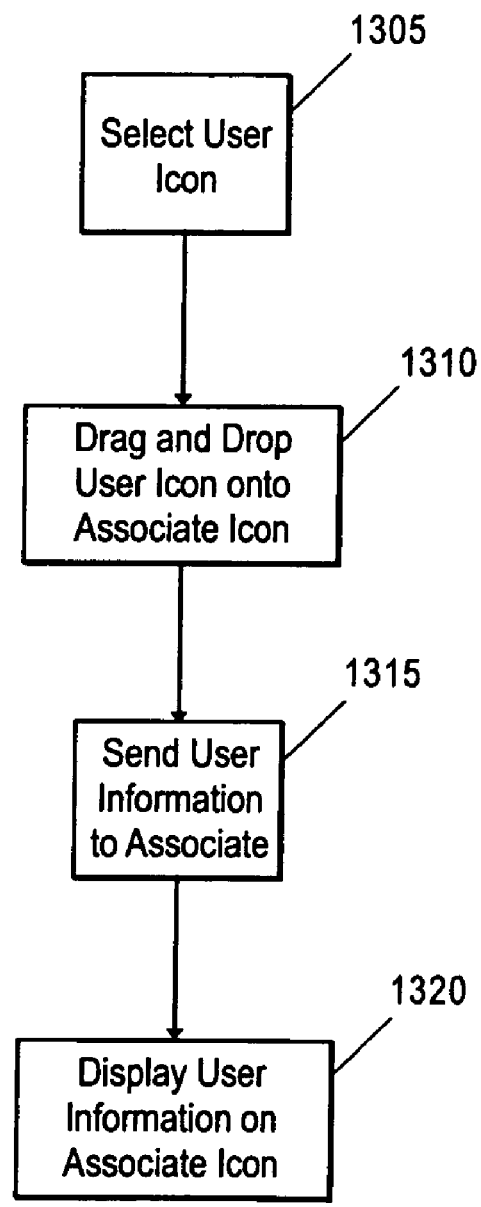
FIG. 13 illustrates one embodiment of a process flow to exchange user information with an associate.

The user interface 5 may also facilitate the exchange of user profile and associate profile information between associates. FIG. 13 illustrates one embodiment of a process flow 1300 to exchange user information with an associate.

At block 1305, the user selects the user icon 10 on the user interface 5.

At block 1310, the user drags and drops the user icon 10 onto the associate icon 30 on the user interface 5. In this way, each user may present to a specific associate, an icon and icon behavior to represent the user as an associate on the user interface 5 of another. For example, the user may send a unique image of herself to be displayed and an audio file of her voice saying "Hello" to be played back by the user relationship software application of the associate receiving the information each time the user attempts to communicate with the associate.

At block 1315, the user profile information is sent to the user relationship software application used by the associate associated with the associate icon 30.

At block 1320, an associate icon 20–70 associated with the user that sent the user information is displayed on the user interface 5 generated by the user relationship software application associated with associate icon 30. The associate icon 20–70 will exhibit the behavior transferred with the icon.

Figure 14:
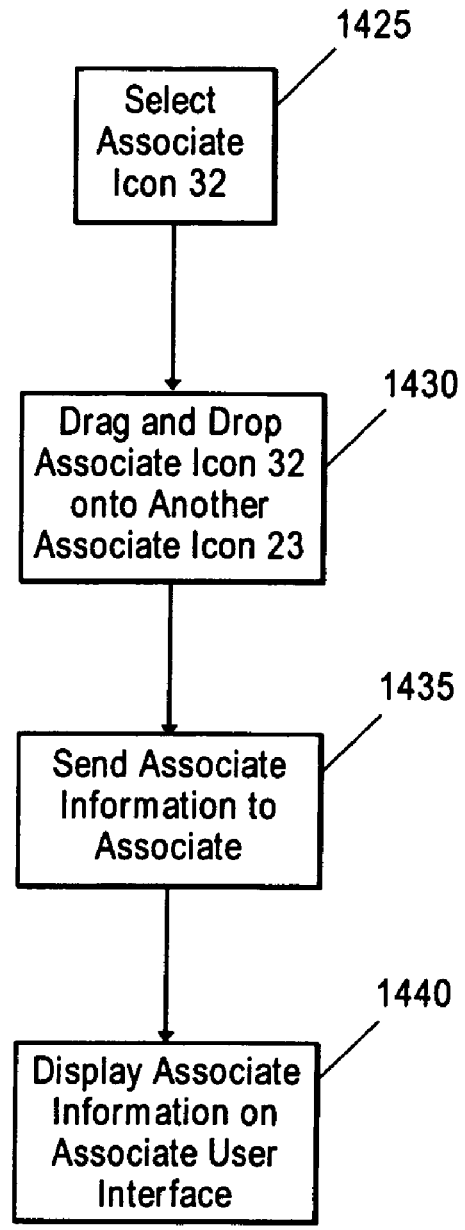
FIG. 14 illustrates one embodiment of a process flow to exchange associate information with an associate.

The user may also share the profile information of an associate with another associate. FIG. 14 illustrates one embodiment of a process flow 1422 to exchange associate information.

At block 1425, the user selects the associate icon 32, including the associate information to be shared with the associate associated with associate icon 23.

At block 1430, the user drags and drops the associate icon 32 onto the associate icon 23.

At block 1435, the associate profile information associated with associate icon 32 is automatically sent to the associate associated with the associate icon 23.

At block 1440, the associate icon 32 will appear on the user interface 5 of the user relationship software application associated with the associate of associate icon 23.

The new associate icon 32 may exhibit behavior to indicate that the new associate icon 32 has been newly added to associate icon 23's relationship user interface 5. For example, the newly added associate icon 32 may appear in red, blinking, or with a control box querying the user whether it is acceptable to add the new associate icon 32 onto the user interface 5 of associate icon 23.

Figure 15:
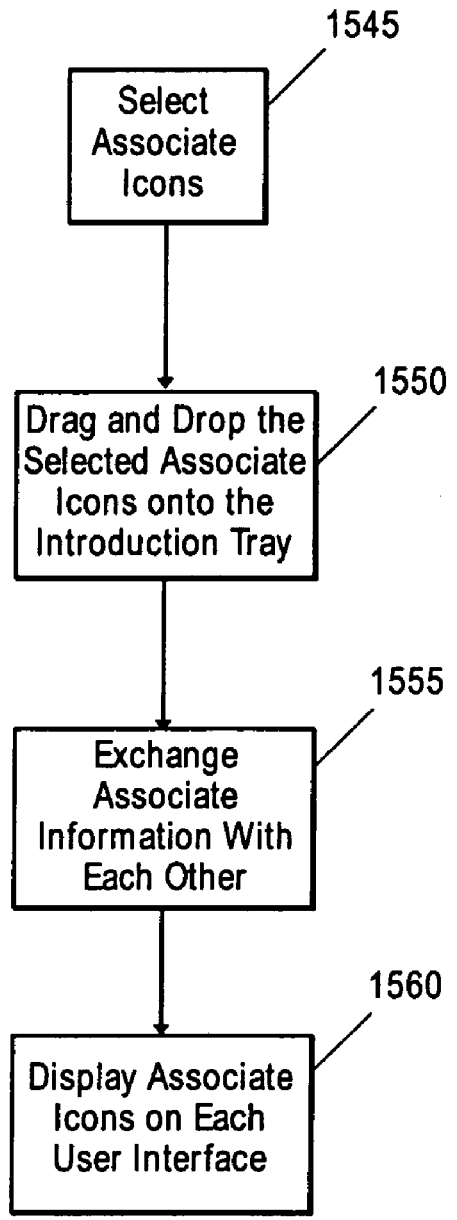
FIG. 15 illustrates one embodiment of a process flow to introduce associates.

FIG. 15 illustrates one embodiment of a process flow 1542 to introduce associates. At block 1545, the user selects two or more of the associate icons 20–70 that the user would like to introduce to each other. This may be, for example, to set the selected associate icons on a blind date or to introduce them for business purposes.

At block 1550, the user drags and drops the selected associate icons 20–70 onto an introduction tray. The introduction tray is a separate area that is used to introduce the selected parties.

At block 1555, the user associate information for each selected associate icon 20–70 is automatically sent to each other.

At block 1560, the associate icon 20–70 of each introduced party appears on the user interface 5 of the other. The new associate icon 20–70 may exhibit behavior to indicate the new associate icon 20–70 has been introduced. For example, the introduced party may appear in red, blinking, or with a control box informing the user of whom the new associate is and who is introducing them. A control box may also appear to query the user whether it is acceptable to add the new associate icon 20–70 onto her user interface 5.

In this way, the associate information for two or more associates is exchanged between known or unknown associates. In one embodiment, the user selects and highlights two associate icons 20–70 to be introduced. The user then right-clicks and selects the option to introduce the associates. The associate icon 20–70 of each associate will then appear on the relationship user interface 5 of the other.

In one embodiment, the associate profile may include a field(s) which allows a user to set the coordinates of where she would like to be displayed on the user interface 5 of another if the icon is exchanged. In this way, a user may choose her own position on the user interface 5 of another. Also, the user is capable of determining which information is to be shared with another associate when exchanging information. For example, the user may decide not to share birth date information with all or specific associates.

It is well known that interpersonal relationships are not static. Relationships evolve and associates enter and leave the life of a person over a period of time. In one embodiment, the user relationship software application visualizes changes in relationships between the user and each associate over time by dynamically re-positioning the associate icons 20–70 on the user interface 5. In one embodiment, the re-positioning of the associate icons 20–70 is based on perceived changes in the relationships. For example, an associate icon 20–70 representing a close friend might move further from the user icon 10 if there is little interaction (e.g., communications) between the user and the close friend over time.

Figure 16:
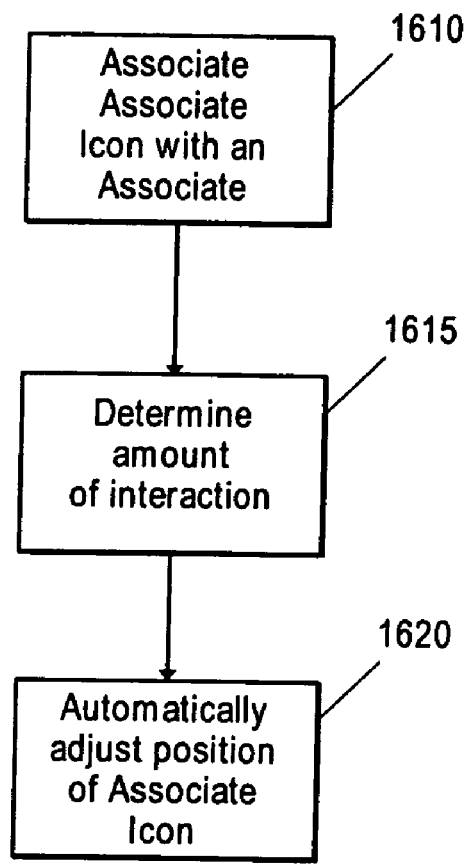
FIG. 16 illustrates a process flow for visualizing a relationship over time.

FIG. 16 illustrates a process flow 1600 for visualizing a relationship over time.

At block 1610, the user relationship software application associates an associate icon 20–70 with an associate.

At block 1615, the user relationship software application determines an amount of interaction between the user and the associate.

At block 1620, the user relationship software application automatically adjusts the position of the associate icon 20–70 associated with the associate based on the amount of interaction determined between the user and the associate.

In one embodiment, the perceived changes in a relationship may be based on a number of factors. For example, the closeness of the associate icon 20–70 to the user icon 10 may be based on who the associate is, a number of times the parties have communicated within a specific time frame, a length of a composed or received text communication (e.g., an electronic mail communication, instant message, etc.), the amount of time spent communicating (e.g., via voice communication, an Internet chat, instant messaging, etc.), how long the associate and user have known each other, the number of urgent communications received from the associate within a timeframe, how important the relationship is to the user, how close the associate lives to the user, etc. It is understood that the invention is not limited to only the factors described and one of ordinary skill in the art will recognize other factors not described herein so as not to obscure the description.

In one embodiment, the distance an associate icon 20–70 may move from/toward the user icon 10 over a period of time may be based on a relationship category associated with the associate icon 20–70. As will be further described below, an associate icon 20–70 may be categorized based on any number of categories, such as immediate family, close friend, friend, new acquaintance, co-worker, and bowling member, among other examples.

In addition, an associate icon 20–70 categorized as a family member or close friend may be configured to move a shorter distance from the user icon 10 over time. While an associate icon categorized as a co-worker or new acquaintance, with little history of interaction, may move a greater distance from the user over the same time period.

Figure 17:
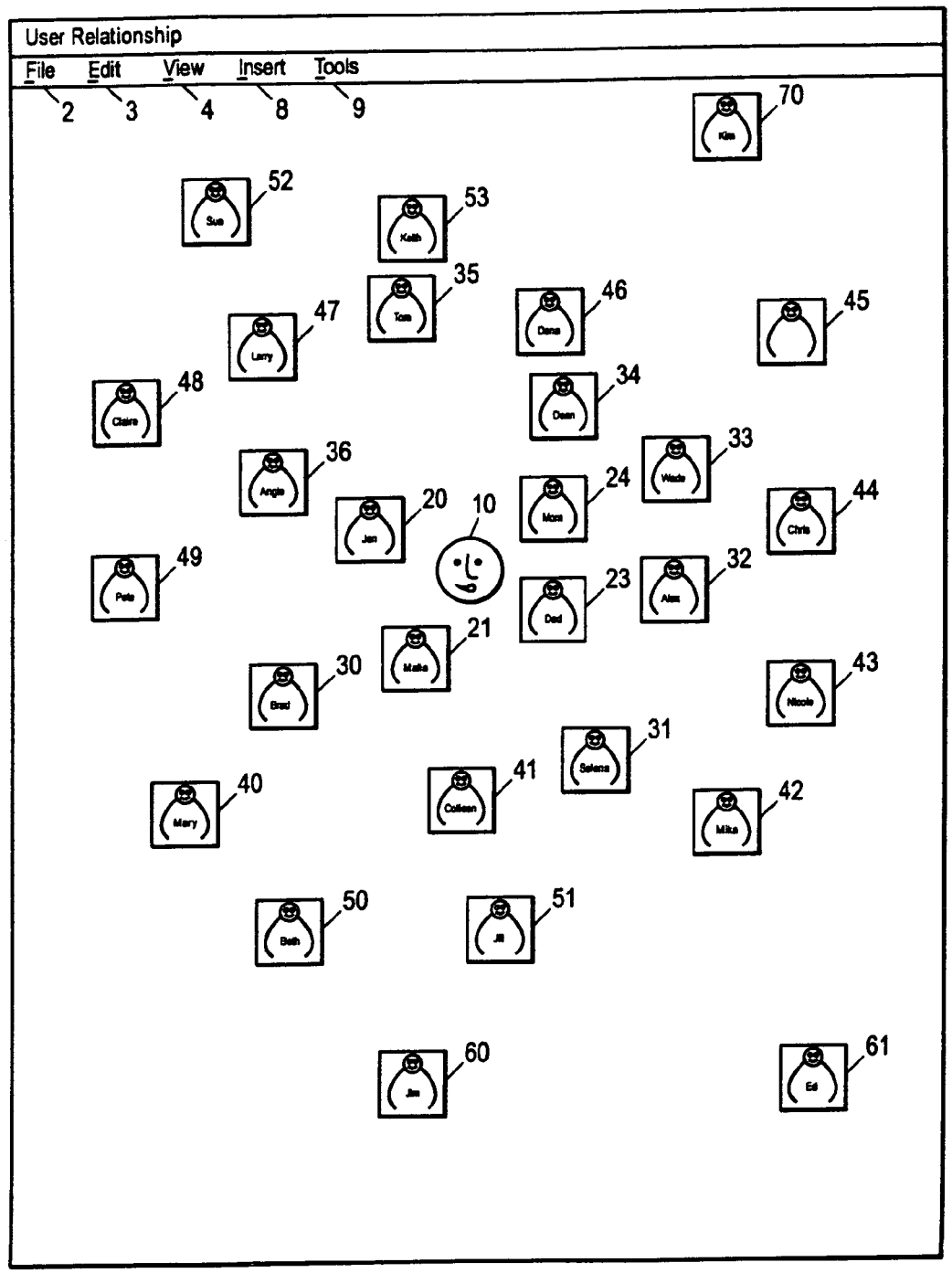
FIG. 17 illustrates one embodiment of the movement of associate icons.

FIG. 17 illustrates the movement of associate icon 31 and associate icon 35 after six months from the visualization expressed in FIG. 1. The associate icon 31 is categorized as a close friend and associate icon 35 is categorized as a co-worker. In comparing FIG. 1 and FIG. 17, the movement of associate icon 31 is a shorter distance than the movement of associate icon 35 over the same period of time and with no communication with the user. FIG. 17 illustrates the varying distances in movement between associate icons 20–70 based on perceived changes in the relationship between the user and associates.

Furthermore, a stronger relationship dictates to the user relationship software application to move an associate icon 20–70 back toward the user icon 10 sooner than an associate icon 20–70 having a weaker relationship. For example, a close friend that had drifted toward the outer edge of the user interface 5 may move a large distance toward the user icon 10 after a single communication than an associate with a weaker relationship.

Figure 18:
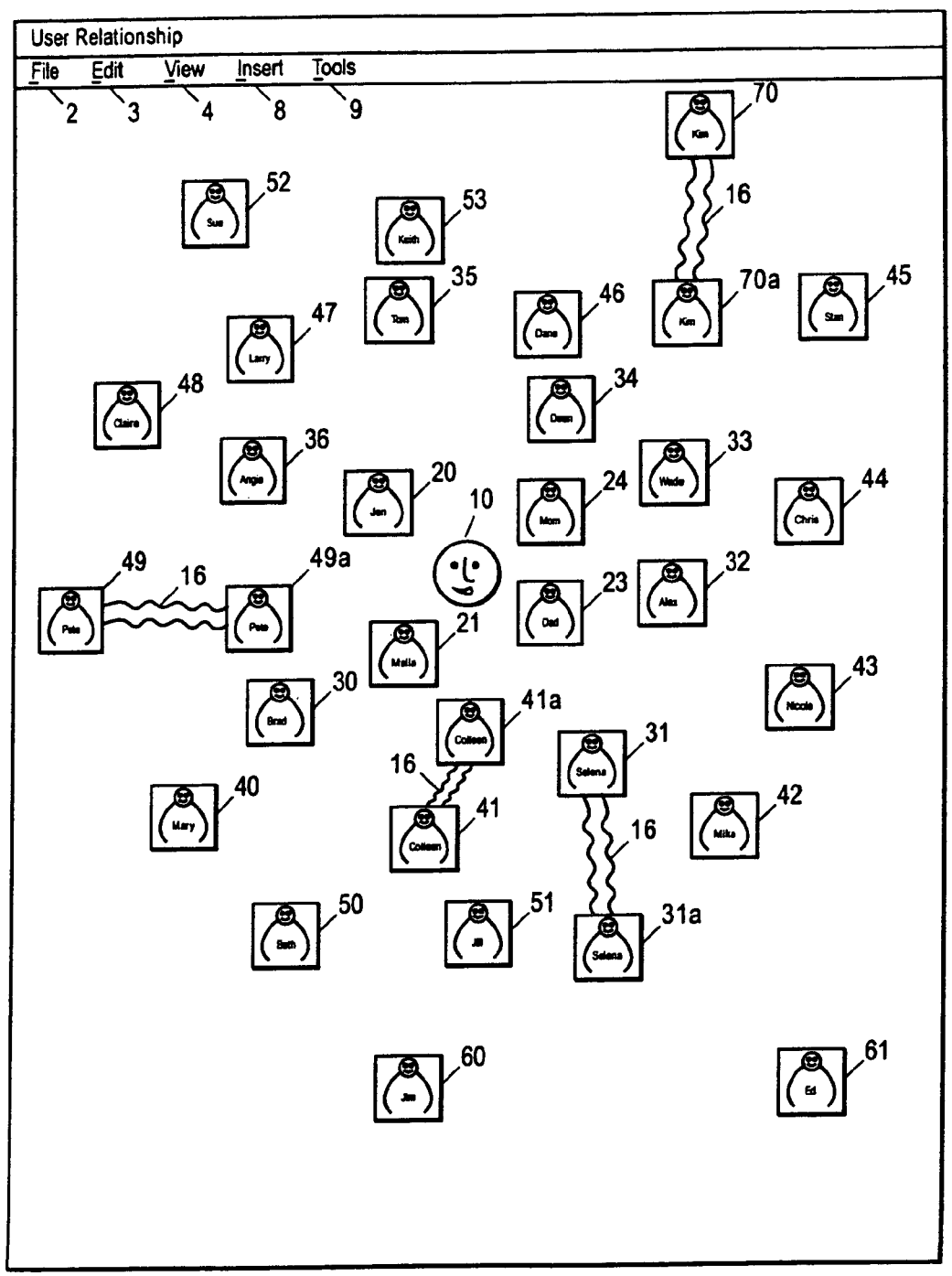
FIG. 18 illustrates one embodiment of an animated progression of relationships.

The user relationship software application includes a feature to visualize the evolution of a relationship over a specific time period. FIG. 18 illustrates an animated progression of relationships over six months according to one embodiment. For example, the user of the user relationship software application may determine to view the evolution of all relationships over a year. The user may initiate this feature by selecting from the tools menu 9. Upon initiating this feature, the user interface 5 may show each associate icon 20–70 moving based on the evolution of the relationship over the past year. FIG. 18 shows the positions of the relationships of associate icon 31*a*, associate icon 49*a*, and associate icon 70*a* six months ago and their migration to their current positions at associate icon 31, associate icon 49, and associate icon 70. The movement of the associate icons 31, 49, and 70 we shown with shadows 16 to trace the movement. Accordingly, the user interface 5 visualizes that over the past six months, the relationship between the user and the associate associated with associate 31 has gotten stronger, while the relationships between the user and the associate associated with associate icon 49 and associate icon 70 have gotten weaker.

It should be appreciated that the mapping of a relationship in this way helps the user to visually identify those friends or family that appear important in the life of the user and how relationships change over time. Also, the mapping identifies those relationships that may be slipping away. For example, the movement of an associate icon 20–70 of a close friend that has moved further from the user may alert the user to initiate a communication with the close friend before the friendship fades away.

In a business environment, the movement of the icons may represent relationships between customers or clients, which may be fading away. In this way, the user may identify customers that need a phone call or those that have required excessive handholding over a period of time.

It should be appreciated that the importance of a relationship may account for the positioning of an associate icon 20–70 a fixed distance or a variable distance from the user icon 10. That is, for example, associate icons 20–70 representing each close friend may be positioned the same distance from the user icon 10 or each close friend associate icon 20–70 may be a specific distance from the user icon 10 based on a number of perceived changes to be further described below.

The user relationship software application has the capability to automatically position each of the associate icons 20–70 on the user interface 5. In one embodiment, the user relationship software application ensures the associate icons 20–70 are evenly spaced and balanced radially about the user icon 10, thereby avoiding the overlaying of any associate icon 20–70. Factors used to determine the balanced positioning of associate icons 20–70 might include the number of associate icons 20–70 to be balanced and the number of pixels on the monitor output device, among other factors. Automatic positioning may be performed at any frequency of time including every second, minute, hour, day, week, etc.

The user may also configure a specific associate icon 20–70 to remain in a fixed location. For example, the user may decide to permanently position the associate icon 24, associated with her mother, close to the user icon 10. In this way, the user interface 5 may visualize the movement of specific associate icons 20–70 and the non-movement of other associate icons 20–70 over time.

Figure 19:
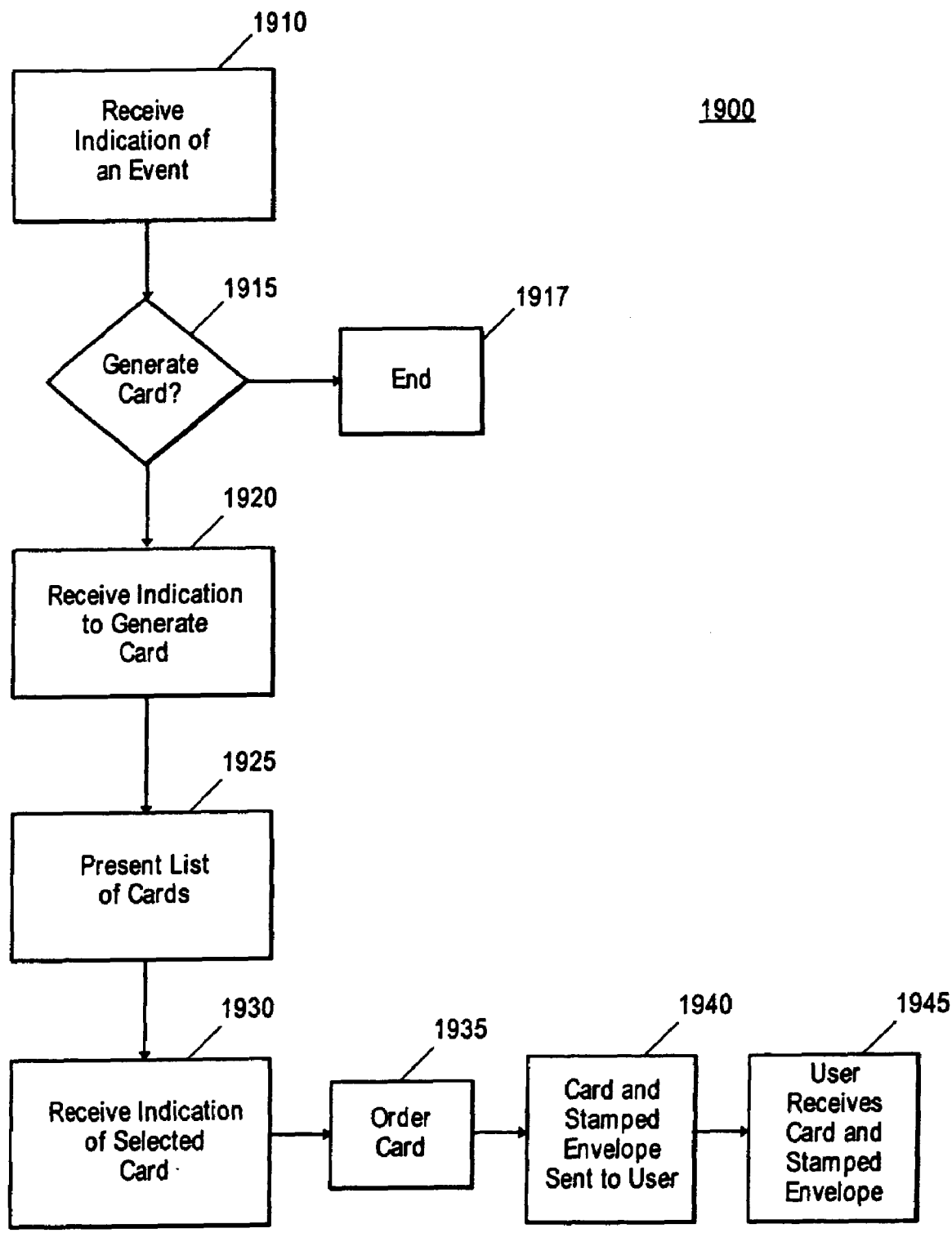
FIG. 19 illustrates one embodiment of a process flow to send a greeting card.

It should be appreciated that the user relationship software application may also generate gifts for an associate, such as a greeting card or a slide show. The exchange of gifts to associates is one way to keep a relationship. FIG. 19 illustrates one embodiment of a process flow 1900 to send a greeting card. At block 1910, the user receives an indication of an event (e.g., a birthday, an anniversary, etc.) of an associate. At block 1915, the user relationship software application queries the user whether to generate a greeting card. At block 1917, the user relationship software application receives an indication from the user to not generate a greeting card, and process 1900 ends. At block 1920, the user relationship software application receives an indication from the user to generate a card. At block 1925, the user relationship software application provides the user with a list of cards to choose from. At block 1930, the user relationship software application receives an indication of which card the user approves of. At block 1935, the user relationship software application communicates with a greeting card server to order the card. At block 1940, the greeting card server facilitates the sending of the card to the user (e.g., via the United States Postal Service, United Parcel Service, Federal Express, etc.). At block 1945, the user receives the ordered card and a stamped envelope addressed to the mailing address of the associate. The user may write a special message in the card. The user may then mail the card to the associate.

For example, the user relationship software application reminds the user of an event (e.g., such as the birthday of her niece) and may provide a countdown to the happening of the event as described above. The user relationship software application suggests numerous cards and, upon making a selection, the card arrives in the mail (e.g., 5 days later) with the stamped envelope addressed to the user's niece. Upon signing the card, the user mails the card to her niece. In this way, the niece receives a quality card with a personal note from the user.

Figure 20:
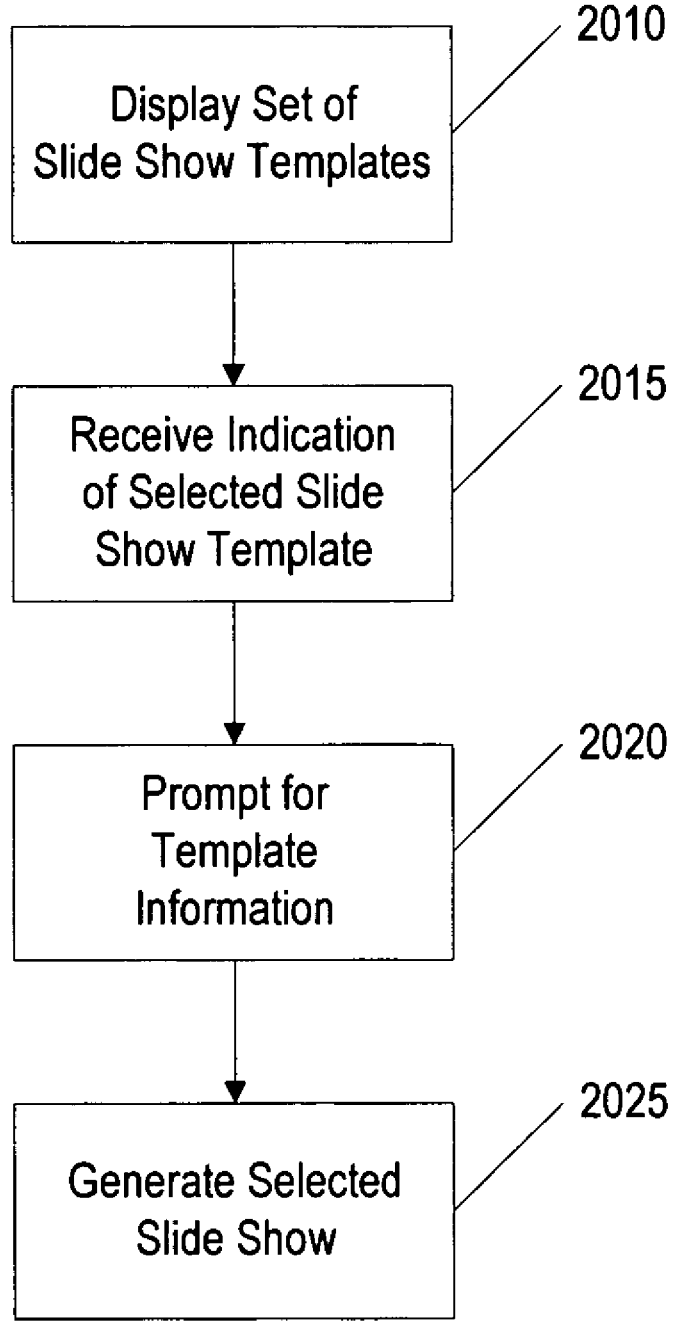
FIG. 20 illustrates one embodiment of a process flow to generate a slide show.

FIG. 20 illustrates one embodiment of a process flow 2000 to generate a slide show. At block 2010, the user relationship software application presents a set of slide show templates to the user. Each slide show template may include a set of images that tells a story similar to a storybook. However, the names and images of the characters are integrated into the story by the user relationship software application.

At block 2015, the user relationship software application receives an indication of which slide show template the user has chosen. At block 2020, the user relationship software application prompts the user for template information about the subject of the slide show. The template information may include one or more images of associates and/or audio files to integrate with the slide show.

At block 2025, the user relationship software application generates a slide show based on the collected template information. This slide show may be sent to the associate as a gift. In one embodiment, the template is mostly blank and the user may generate the storyline and select the appropriate scenery.

Figure 21:
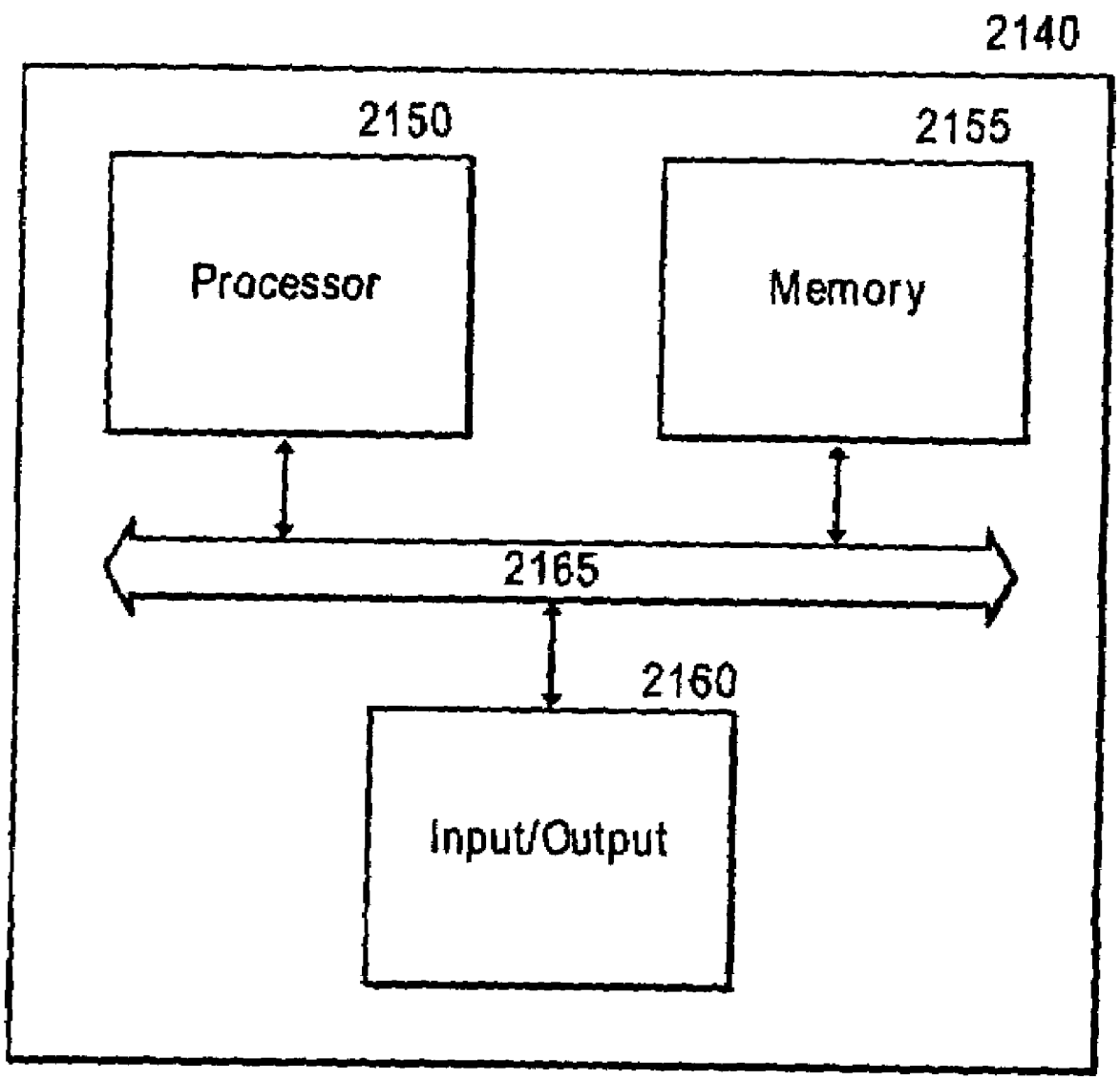
FIG. 21 illustrates an exemplary computer system according to one embodiment of the invention.

FIG. 21 illustrates one embodiment of a computer system suitable for performing the features of the user relationship software application. The computer system 2140 includes a processor 2150, a memory 2155, and an input/output capability 2160, all coupled to a system bus 2165. Such a configuration encompasses personal computer systems, network computers, television based systems (such as Web TVs or set-top boxes), an interface in a car (e.g., dashboard display, flat panel display coupled with the car, etc.), hand-held devices (such as a digital camera, a mobile phone, or a personal digital assistant), and similar devices. It should be appreciated that the user relationship software application ensures that information is accessible across multiple platforms via the user interface 5.

The processor 2150 represents a central processing unit of any type of architecture (such as a CISC, RISC, VLIW) or hybrid architecture. In addition, the processor 2150 could be implemented on one or more chips. The memory 2155 is configured to store instructions which, when executed by the processor 2150, perform the methods described herein. The memory 2155 may also store the user information and the associate information.

Input/output 2160 may include components to facilitate user interaction with the computer system 2140 such as a keyboard, mouse, a pointer, a display monitor, a microphone, a speaker, a display, a network card (e.g., Ethernet, inferred, cable modem, fax/modem, etc), etc. For example, Input/output 2160 provides for the display of the user interface 5, associate profile 1100, and user profile 1200, or portions or representations thereof. Input/output 2160 also encompasses various types of machine-readable media, including any type of storage device that is accessible by the processor 2150. For example, a machine-readable medium may include read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.) etc. Thus, a machine-readable medium includes any mechanism that provides (i.e., stores and/or transmits) information in a form readable by a machine (e.g., a computer). One of skill in the art will immediately recognize that the term "machine-readable medium/media" further encompasses a carrier wave that encodes a data signal.

It will also be appreciated that the operating system software executing the user relationship software stored in memory 2155 may control the computer system 2140. The operating system may be, for example, PC-based, Mac-based, Unix-based, PDA-based, etc. Input/output 2160 and related media store the machine-executable instructions for the operating system and methods of the present invention.

In addition, the bus 2165 may represent one or more busses (e.g., PCI, ISA, X-Bus, EISA, VESA, etc.) and bridges (also termed as bus controllers). While this embodiment is described in relation to a single processor computer system, the invention could be implemented in a multi-processor computer system.

The description of FIG. 21 is intended to provide an overview of computer hardware and other operating components suitable for implementing the invention, but is not intended to limit the applicable environments. It will be appreciated that the computer system 2140 is one example of many possible computer systems that have different architectures. A typical computer system will usually include at least a processor, a memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Figure 22:
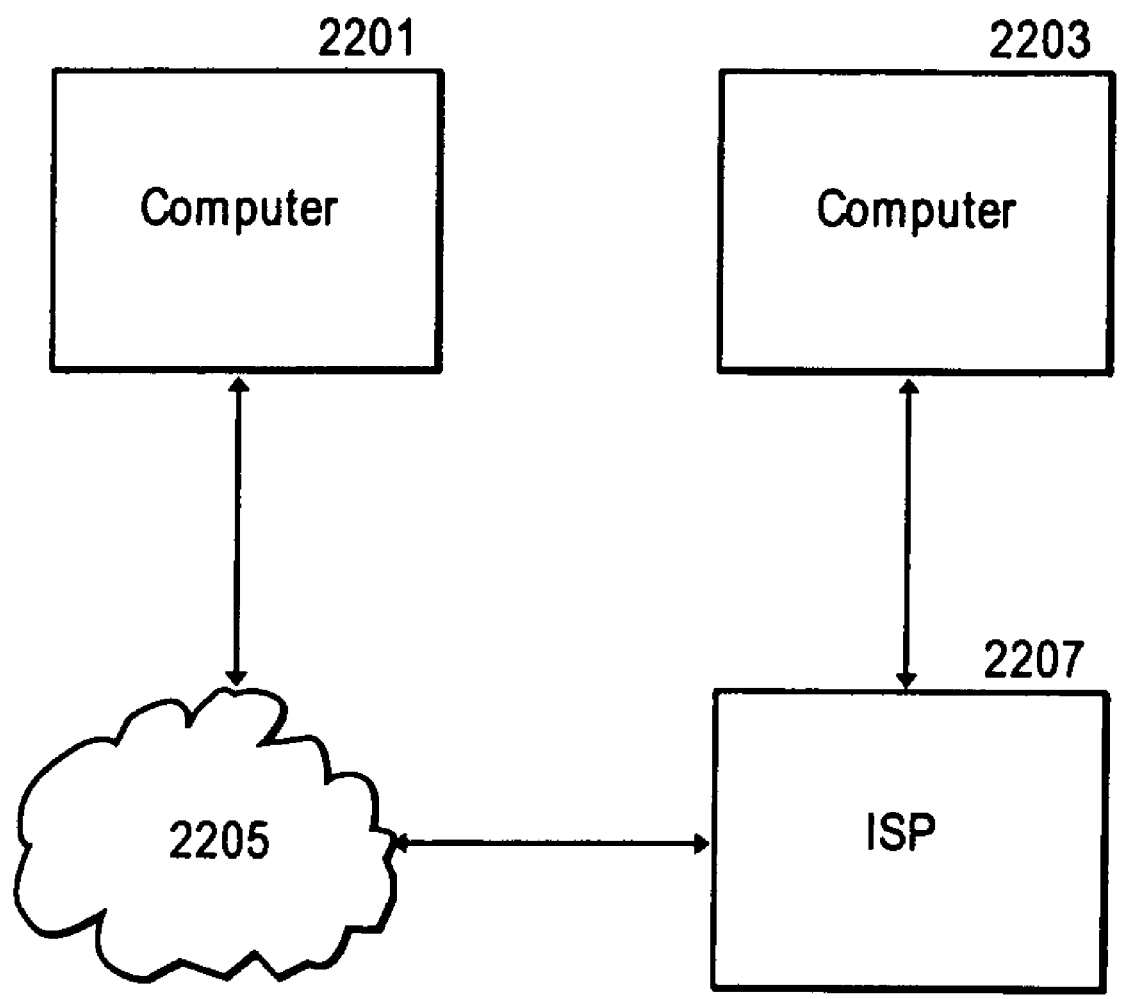
FIG. 22 illustrates a network environment suitable for the computer system illustrated in FIG. 21.

FIG. 22 illustrates a network environment suitable for the computer system illustrated in FIG. 21. In one embodiment, as shown in FIG. 22, a computer 2201 is part of, or coupled to a network 2205, such as the Internet, to exchange data with another computer 2203, as either a client or a server computer. For example, the computer 2201 may exchange associate information with computer 2203 as described herein. In one embodiment, computer 2203 may be the greeting card server that receives the card order from the user of the computer 2201 via the user relationship software. Typically, a computer couples to the Internet through an ISP (Internet Service Provider) 2207 and executes a conventional Internet browsing application to exchange data with a server. Other types of applications allow clients to exchange data through the network 2205 without using a server. It is readily apparent that the present invention is not limited to use with the Internet. Directly coupled and private networks are also contemplated.

It will be appreciated that more or fewer processes may be incorporated into the methods illustrated in FIGS. 10, 13, 14, 15, 16, 19 and 20 without departing from the scope of the invention and that no particular order is implied by the arrangement of blocks shown and described herein. It further will be appreciated that the method(s) described in conjunction with FIGS. 10, 13, 14, 15, 16, 19 and 20 may be embodied in machine-executable instructions (e.g. software). The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions, which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and carrier wave signals. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or to produce a result.

Thus, a user interface 5 having a user icon 10 and associate icons 20–70 to facilitate communication and sharing, and to visualize an interpersonal relationship has been described. The associate icons 20–70 are repositioned to visualize the interpersonal relationships based on perceived changes in the relationship as described herein. However, the invention is not limited to these factors. Furthermore, the user may select various factors for the user relationship software application to determine how to position the associate icons 20–70 to more accurately describe the relationship and, thus, the invention is not limited to only those described herein.

In addition, the invention is not limited to visualizing relationships based on rearranging the associate icons 20–70 close to or further from the user icon 10. For example, the relationships may be visualized by increasing or decreasing the size of the associate icons 20–70.

In one embodiment, the user relationship software application is capable of displaying a desktop icon to convey how many new communications for the user has been received. For example, the desktop icon may be displayed on a task bar, a toolbar, a desktop interface, or on a cursor. The desktop icon may be visible when the user interface 5 is not displayed or when the user relationship software application is processing in the background.

While the invention has been described in terms of several embodiments, those skilled in the art will recognize that the invention is not limited to the embodiments described. The method and apparatus of the invention can be practiced with modification and alteration within the scope of the appended claims. The description is thus to be regarded as illustrative instead of limiting on the invention.

What is claimed is:

1. A user interface to facilitate a communication between a user and an associate comprising:
   a user icon representing a user;
   a plurality of associate icons representing a plurality of respective associates, wherein the position of each associate icon relative to the user icon illustrates a relationship between the user and the associate;
   a positioning tool enabling the user to selectively position each associate icon at any location within the user interface to define the relationship between the user and each of the associates; and
   a communication tool enabling the user to compose a communication and enabling the user to transmit the communication to at least one of the associates, wherein the communication tool is to be displayed upon selecting at least one of the corresponding associate icons.

2. The user interface of claim 1, wherein a distance between the user icon and each associate icon represents an importance of each relationship.

3. The user interface of claim 1, wherein each associate icon is capable of being repositioned by the user via an input device.

4. The user interface of claim 1, wherein each associate icon is a digital image of the corresponding associate.

5. The user interface of claim 1, wherein-the communication tool includes a voice communication tool to transmit a voice communication from the user to the at least one of the associates.

6. The user interface of claim 1, wherein the selecting the at least one of the corresponding associate icons includes applying a single-click to the at least one of the corresponding associate icons via an input device.

7. The user interface of claim 5, wherein the voice communication tool includes an associate icon section to display an image of the at least one of the associates.

8. The user interface of claim 5, wherein the voice communication tool includes a communication section to visualize previous communications between the user and the at least one of the associates.

9. The user interface of claim 1, further comprising:
   a transmission component to transmit digital content to an associate upon dropping the digital content onto the corresponding associate icon.

10. The user interface of claim 1, wherein the user is capable of selectively indicating an availability to communicate with an associate via the user interface.

11. The user interface of claim 1, wherein the relative position of each associate icon to the user icon varies automatically based on a perceived change in the corresponding relationship.

12. The user interface of claim 1, wherein at least one of the associate icons is to perform an action upon a happening of an event.

13. The user interface of claim 12, wherein the action includes animating the at least one of the associate icons upon receiving a communication from the associate associated with the at least one of the associate icons.

14. The user interface of claim 1, wherein the user icon is to perform an action upon a happening of an event.

15. A method for visualizing interpersonal relationships comprising:
   displaying a user icon representing a user on a user interface;
   displaying one or more associate icons on the user interface, wherein the one or more associate icons represent one or more associates, wherein the one or more associate icons are positioned radially about the user icon, wherein each of the one or more associate icons are positioned on the user interface to visualize a relationship between the user and the one or more associates;
   automatically repositioning one of the associate icons radially relative to the user icon based on extent of content between the user and the associate; and further
   enabling the user to selectively position each associate icon at any location within the user interface to define the relationship between the user and each of the associates.

16. The method of claim 15, wherein positions of the associate icons relative to the user icon represent importance to the user of each relationship between the user and each associate.

17. The method of claim 15, further comprising:
   activating a voice communication tool to transmit a voice communication between the user and one of the associates upon selecting the associate icons representing the one of the associates.

18. The method of claim 17, wherein the selecting includes performing a single click on the associate icon representing the one of the associates via an input device.

19. The method of claim 15, further comprising:
   initiating a transmission of digital content to one of the associates upon dropping the digital content onto the associate icons representing the one of the associates.

20. The method of claim 19, further comprising:
   attaching the digital content to a communication when the communication is initiated within a predetermined amount of time of initiating the transmission of the digital content; and
   transmitting the communication with the attached digital content.

21. The method of claim 15, further comprising:
   enabling a composition of a communication to one of the associates upon selecting the associate icon representing the one of the associates.

22. The method of claim 21, wherein the communication is a voice communication.

23. The method of claim 22, wherein the voice communication includes background music.

24. The method of claim 15, wherein the one or more associate icons are to perform an action upon a happening of an event.

25. The method of claim 15, wherein the user icon is to perform an action upon a happening of an event.

26. The method of claim 15, further comprising:
   rearranging the position of the one or more associate icons based on a perceived change in the relationship between the user and each of the associates associated with each of the associate icons.

27. The method of claim 26, wherein the perceived change in the relationship is based on a number of communications between the user and the associate associated with each of the one or more associate icons.

28. A method of exchanging profile information comprising:

displaying a first user interface graphically presenting strength of a relationship between a user and an associate based on extent of contact between the user and the associate;

receiving a signal indicating dropping of a user icon on the first user interface onto a first associate icon, the user icon representing the user, the first associate icon representing the associate;

in response to the signal, automatically sending user profile information associated with the user icon to the associate, including a second associate icon representing the user to be displayed on a second user interface associated with the associate such that the second user interface graphically presents the strength of the relationship between the user and the associate and further enabling the user to selectively position the associate icon at any location within the first user interface to define the relationship between the user and each of the associates.

29. A method of exchanging profile information comprising:

displaying a first user interface graphically presenting strengths of individual relationships between a user and each of a first and second associate based on extent of contact between the user and each associate;

receiving a signal indicating dropping of a first associate icon on the first user interface onto a second associate icon on the first user interface, the first associate icon representing the first associate, the second associate icon representing the second associate;

in response to the signal, automatically sending associate profile information associated with the first associate icon to the second associate including a third associate icon representing the first associate to be displayed on a second user interface associated with the second associate such that the second user interface graphically presents strengths of individual relationships between the second associate and each of the user and the first associate and further enabling the user to selectively position each associate icon at any location within the first user interface to define the relationship between the user and each of the associates.

30. A method of exchanging profile information comprising:

displaying a first user interface graphically presenting strengths of individual relationships between a user and each of a first and second associate based on extent of contact between the user and each associate;

receiving a first signal indicating dropping of a first associate icon on the first user interface onto an introduction area, the first associate icon representing the first associate;

receiving a second signal indicating dropping of a second associate icon on the first user interface onto the introduction area, the second associate icon representing the second associate in response to the second signal, automatically sending a first associate profile information associated with the first associate to the second associate and automatically sending second associate profile information associated with the second associate to the first associate, the first associate profile information including a third associate icon representing the first associate to be displayed on a second user interface associated with the second associate such that the second user interface graphically presents strengths of individual relationships between the second associate and the first associate, the second associate profile information including a fourth associate icon representing the second associate to be displayed on a third user interface associated with the first associate such that the third user interface graphically presents strengths of individual relationships between the first associate and the second associate and further enabling the user to selectively position each associate icon at any location within the first user interface to define the relationship between the user and each of the associates.

31. The method of claim 15, wherein the extent of the contact between the user and the associate is based on at least one of: a number of times the user and associate have communicated within a specific time frame, a length of a composed or received text communication between the user and the associate, an amount of time the user and associate have spent communicating, a length of time the user and the associate have known each other, a number of urgent communications received by the user from the associate within a time frame, and a geographic distance between the user and the associate.

32. The method of claim 15, wherein a magnitude of the repositioning is dependent on a type of the relationship between the user and the associate.

33. The method of claim 28, wherein graphically presenting the strength of the relationship includes at least one of: enlarging the first associate icon when the strength of the relationship increases, repositioning the first associate icon closer to the user icon when the strength of the relationship increases, and changing a color of the first associate icon when the strength of the relationship decreases.

* * * * *